(12) United States Patent
Elshafie et al.

(10) Patent No.: US 12,028,887 B2
(45) Date of Patent: Jul. 2, 2024

(54) SENSING REPORT QUANTIZATION FOR INTER-USER EQUIPMENT COORDINATION

(71) Applicant: QUALCOMM Incorporated, San Diego, CA (US)

(72) Inventors: Ahmed Elshafie, San Diego, CA (US); Tugcan Aktas, La Jolla, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 17/459,730

(22) Filed: Aug. 27, 2021

(65) Prior Publication Data

US 2023/0061845 A1 Mar. 2, 2023

(51) Int. Cl.
| | |
|---|---|
| *H04W 4/00* | (2018.01) |
| *H04W 28/06* | (2009.01) |
| *H04W 72/02* | (2009.01) |
| *H04W 72/541* | (2023.01) |
| *H04W 72/542* | (2023.01) |

(52) U.S. Cl.
CPC ......... *H04W 72/542* (2023.01); *H04W 28/06* (2013.01); *H04W 72/02* (2013.01); *H04W 72/541* (2023.01)

(58) Field of Classification Search
CPC .............................. H04W 28/02; H04W 72/02
See application file for complete search history.

(56) References Cited

U.S. PATENT DOCUMENTS

| | | | |
|---|---|---|---|
| 9,693,338 B2 | 6/2017 | Zhao et al. | |
| 2020/0022181 A1* | 1/2020 | Li | ...................... H04W 72/0446 |
| 2020/0068534 A1* | 2/2020 | Li | .......................... H04W 72/12 |
| 2021/0067997 A1* | 3/2021 | Wang | ...................... H04W 24/10 |
| 2021/0105104 A1 | 4/2021 | Cao et al. | |

(Continued)

FOREIGN PATENT DOCUMENTS

WO    WO-2022035706 A1 *    2/2022    ............ H04W 72/02

OTHER PUBLICATIONS

International Search Report and Written Opinion—PCT/US2022/040359—ISA/EPO—Nov. 18, 2022.

*Primary Examiner* — Elisabeth Benoit Magloire
(74) *Attorney, Agent, or Firm* — Holland & Hart LLP

(57) ABSTRACT

Methods, systems, and devices for wireless communications are described. Generally, a user equipment (UE) may generate statistical modeling of sensing outcomes (e.g., may identify one or more measurement statistics), and may transmit values that are quantized based on the one or more measurement statistics. Measurement statistics may include one or more of mean and variance of sensing results (e.g., channel quality measurements such as signal to interference ratio (SIR), auto-correlation of measurements or measurement statistics over time, auto-covariance, or the like. In some examples, a UE may incorporate channel measurement statistics into a waveform (e.g., the coordination report) or otherwise compress the measurements. The UE may measure its own self-interference, and may indicate (e.g., in the coordination message) resource availability that reflects the measured self-interference. A receiving UE may use the coordination message to schedule subsequent sidelink communications (e.g., with the transmitting UE or with other UEs).

30 Claims, 12 Drawing Sheets

(56) References Cited

U.S. PATENT DOCUMENTS

| | | | |
|---|---|---|---|
| 2021/0219268 A1 | 7/2021 | Li et al. | |
| 2021/0345145 A1* | 11/2021 | Sarkis | H04L 5/16 |
| 2022/0061095 A1* | 2/2022 | Xue | H04W 72/02 |
| 2022/0070921 A1* | 3/2022 | Xue | H04W 72/044 |
| 2022/0167376 A1* | 5/2022 | Ryu | H04W 72/20 |
| 2022/0183017 A1* | 6/2022 | Wu | H04B 17/309 |
| 2022/0279377 A1* | 9/2022 | Liu | H04W 28/0278 |
| 2022/0322360 A1* | 10/2022 | Ye | H04W 76/14 |
| 2022/0369287 A1* | 11/2022 | Abotabl | H04W 72/0473 |
| 2022/0394560 A1* | 12/2022 | Yu | H04W 72/0446 |
| 2022/0394675 A1* | 12/2022 | Zhou | H04W 74/0808 |
| 2022/0400476 A1* | 12/2022 | Abotabl | H04L 1/20 |
| 2023/0011471 A1* | 1/2023 | Sarkis | H04W 76/14 |
| 2023/0030900 A1* | 2/2023 | Xue | H04W 72/0446 |
| 2023/0131882 A1* | 4/2023 | Lin | H04W 72/0446 370/329 |
| 2023/0171803 A1* | 6/2023 | Wu | H04W 72/0446 370/329 |
| 2023/0224932 A1* | 7/2023 | Hwang | H04W 74/0808 370/329 |
| 2023/0269706 A1* | 8/2023 | Yoshioka | H04L 5/00 370/329 |
| 2023/0337187 A1* | 10/2023 | Ye | H04W 52/028 |

* cited by examiner

SENSING REPORT QUANTIZATION FOR INTER-USER EQUIPMENT COORDINATION

FIELD OF TECHNOLOGY

The following relates to wireless communications, including sensing report quantization for inter-user equipment coordination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sensing report quantization for inter-user equipment coordination. Generally, a user equipment (UE) may generate statistical modeling of sensing outcomes (e.g., may identify one or more measurement statistics), and may transmit values that are quantized based on the one or more measurement statistics. Measurement statistics may include one or more of mean and variance of sensing results (e.g., channel quality measurements such as signal to interference ratio (SIR)), auto-correlation of measurements or measurement statistics over time, auto-covariance, or the like. In some examples, a UE may incorporate channel measurement statistics into a waveform (e.g., the coordination report) or otherwise compress the measurements. The UE may measure its own self-interference, and may indicate (e.g., in the coordination message) resource availability that reflects the measured self-interference. A receiving UE may use the coordination message to schedule subsequent sidelink communications (e.g., with the transmitting UE or with other UEs).

A method for wireless communications at a first user equipment (UE) is described. The method may include performing, during a selection window including a set of multiple sidelink resources, one or more channel quality measurements, generating, based on the one or more channel quality measurements, one or more measurement statistics for the set of multiple sidelink resources, and transmitting, to a second UE, a coordination message including a set of multiple availability statuses for each of the set of multiple sidelink resources, each availability status associated with a quantization level, where the quantization level is based on the one or more measurement statistics.

An apparatus for wireless communications at a first UE is described. The apparatus may include a processor, memory coupled with the processor, and instructions stored in the memory. The instructions may be executable by the processor to cause the apparatus to perform, during a selection window including a set of multiple sidelink resources, one or more channel quality measurements, generating, based at least in part on the one or more channel quality measurements, one or more measurement statistics for the set of multiple sidelink resources, and transmit, to a second UE, a coordination message including a set of multiple availability statuses for each of the set of multiple sidelink resources, each availability status associated with a quantization level, where the quantization level is based on the one or more measurement statistics.

Another apparatus for wireless communications at a first UE is described. The apparatus may include means for performing, during a selection window including a set of multiple sidelink resources, one or more channel quality measurements, means for generating, based on the one or more channel quality measurements, one or more measurement statistics for the set of multiple sidelink resources, and means for transmitting, to a second UE, a coordination message including a set of multiple availability statuses for each of the set of multiple sidelink resources, each availability status associated with a quantization level, where the quantization level is based on the one or more measurement statistics.

A non-transitory computer-readable medium storing code for wireless communications at a first UE is described. The code may include instructions executable by a processor to perform, during a selection window including a set of multiple sidelink resources, one or more channel quality measurements, generating, based at least in part on the one or more channel quality measurements, one or more measurement statistics for the set of multiple sidelink resources, and transmit, to a second UE, a coordination message including a set of multiple availability statuses for each of the set of multiple sidelink resources, each availability status associated with a quantization level, where the quantization level is based on the one or more measurement statistics.

Some examples of the method, apparatuses, and non-transitory computer-readable medium described herein may further include operations, features, means, or instructions for transmitting, in the coordination message, an indication of the one or more measurement statistics, where the one or more measurement statistics include a mean channel quality measurement for the set of multiple sidelink resources, and a variance of the one or more channel quality measurements for each of the set of multiple sidelink resources.

Some examples of the method, apparatuses, and non-transitory computer-readable medium described herein may further include operations, features, means, or instructions for determining a set of quantization levels, each quantization level based on the mean channel quality measurement and the variance of the one or more channel quality measurements, where a first subset of the set of quantization levels correspond to channel quality measurements that may be less than the mean channel quality measurement, and a second subset of the set of quantization levels correspond to channel quality measurements that may be greater than the mean channel quality measurement.

In some examples of the method, apparatuses, and non-transitory computer-readable medium described herein, a number of quantization levels in the first subset may be equal to a number of quantization levels in the second subset.

In some examples of the method, apparatuses, and non-transitory computer-readable medium described herein, a number of quantization levels in the first subset may be equal to a number of quantization levels in the second subset.

Some examples of the method, apparatuses, and non-transitory computer-readable medium described herein may further include operations, features, means, or instructions for performing a normalization function on the one or more measurement statistics, where the quantization levels may be based on the normalized one or more measurement statistics.

In some examples of the method, apparatuses, and non-transitory computer-readable medium described herein, the one or more measurement statistics includes one or more differential values for the one or more channel quality measurements.

Some examples of the method, apparatuses, and non-transitory computer-readable medium described herein may further include operations, features, means, or instructions for transmitting, in the coordination message, an indication of the one or more measurement statistics, where the one or more measurement statistics include a mean channel quality measurement for the set of multiple sidelink resources, and a cross-correlation value across a set of multiple time units of the selection window for each of the set of multiple sidelink resources.

In some examples of the method, apparatuses, and non-transitory computer-readable medium described herein, inputting, into a neural network, the one or more measurement statistics, generating, as an output of the neural network, an initial set of values for the availability statuses of the set of multiple sidelink resources, and applying a one-bit quantizer to the initial set of values to generate the set of multiple availability statuses for each of the set of multiple sidelink resources, where each of the set of multiple availability statuses may be associated with a first quantization level or a second quantization level based on the one-bit quantizer.

In some examples of the method, apparatuses, and non-transitory computer-readable medium described herein, generating the one or more measurement statistics may include operations, features, means, or instructions for performing a Fourier transform on the one or more channel quality measurements, determining a correlation level for a set of outputs of the Fourier transform, and generating the set of quantization levels based on the correlation level.

Some examples of the method, apparatuses, and non-transitory computer-readable medium described herein may further include operations, features, means, or instructions for transmitting, in the coordination message, an indication of a subset of the set of outputs that may have non-zero values, the indication of the subset including a value of each of the subset of the set of outputs, a location in a discrete Fourier transform domain of each of the subset of the set of outputs, or any combination thereof.

Some examples of the method, apparatuses, and non-transitory computer-readable medium described herein may further include operations, features, means, or instructions for initiating a compression procedure, based on a bandwidth associated with the compression procedure, determining that a likelihood of the compression procedure resulting in a successful compression of the one or more channel quality measurements satisfies a threshold, and compressing the one or more channel quality measurements, where generating the one or more measurement statistics may be based on the compressing.

Some examples of the method, apparatuses, and non-transitory computer-readable medium described herein may further include operations, features, means, or instructions for initiating a compression procedure for the one or more measurement statistics, based on a bandwidth associated with the compression procedure, determining that a likelihood of the compression procedure resulting in a successful compression of the one or more channel quality measurements does not satisfy a threshold, transmitting, to the second UE on a sidelink control channel, an indication that the compression procedure was not successful, and transmitting, to the second UE on a sidelink shared channel in the coordination message, an indication of the one or more channel quality measurements.

Some examples of the method, apparatuses, and non-transitory computer-readable medium described herein may further include operations, features, means, or instructions for measuring self-interference generated by and received by the first UE and determining the availability for each of the set of multiple sidelink resources based on the one or more measurement statistics and the self-interference.

A method for wireless communications at a second UE is described. The method may include receiving, from a first UE, a coordination message including a set of multiple availability statuses for each of a set of multiple sidelink resources, each availability status associated with a quantization level, where each quantization level is based on the one or more measurement statistics, determining an availability status of the set of multiple sidelink resources based on the coordination message and the quantization levels, and communicating on one or more of the set of multiple sidelink resources based on the determined availability statuses.

An apparatus for wireless communications at a second UE is described. The apparatus may include a processor, memory coupled with the processor, and instructions stored in the memory. The instructions may be executable by the processor to cause the apparatus to receive, from a first UE, a coordination message including a set of multiple availability statuses for each of a set of multiple sidelink resources, each availability status associated with a quantization level, where each quantization level is based on the one or more measurement statistics, determine an availability status of the set of multiple sidelink resources based on the coordination message and the quantization levels, and communicate on one or more of the set of multiple sidelink resources based on the determined availability statuses.

Another apparatus for wireless communications at a second UE is described. The apparatus may include means for receiving, from a first UE, a coordination message including a set of multiple availability statuses for each of a set of multiple sidelink resources, each availability status associated with a quantization level, where each quantization level is based on the one or more measurement statistics, means for determining an availability status of the set of multiple sidelink resources based on the coordination message and the quantization levels, and means for communicating on one or more of the set of multiple sidelink resources based on the determined availability statuses.

A non-transitory computer-readable medium storing code for wireless communications at a second UE is described. The code may include instructions executable by a processor to receive, from a first UE, a coordination message including a set of multiple availability statuses for each of a set of multiple sidelink resources, each availability status associated with a quantization level, where each quantization level is based on the one or more measurement statistics, determine an availability status of the set of multiple sidelink resources based on the coordination message and the quantization levels, and communicate on one or more of the set of multiple sidelink resources based on the determined availability statuses.

Some examples of the method, apparatuses, and non-transitory computer-readable medium described herein may further include operations, features, means, or instructions for receiving, in the coordination message, an indication of the one or more measurement statistics, where the one or more measurement statistics include a mean channel quality measurement for the set of multiple sidelink resources, and a variance of the one or more channel quality measurements for each of the set of multiple sidelink resources.

In some examples of the method, apparatuses, and non-transitory computer-readable medium described herein, the one or more measurement statistics includes one or more differential values for the one or more channel quality measurements.

Some examples of the method, apparatuses, and non-transitory computer-readable medium described herein may further include operations, features, means, or instructions for receiving, in the coordination message, an indication of the one or more measurement statistics, where the one or more measurement statistics include a mean channel quality measurement for the set of multiple sidelink resources, and a cross-correlation value across a set of multiple time units of the selection window for each of the set of multiple sidelink resources.

Some examples of the method, apparatuses, and non-transitory computer-readable medium described herein may further include operations, features, means, or instructions for receiving, in the coordination message, an indication of a subset of a set of outputs of a Fourier transform performed on the one or more channel quality measurements that may have non-zero values, the indication of the subset including a value of each of the subset of the set of outputs, a location in a discrete Fourier transform domain of each of the subset of the set of outputs, or any combination thereof.

Some examples of the method, apparatuses, and non-transitory computer-readable medium described herein may further include operations, features, means, or instructions for receiving, from the first UE on a sidelink shared channel in the coordination message, an indication of one or more channel quality measurements.

DETAILED DESCRIPTION

Figure 1:
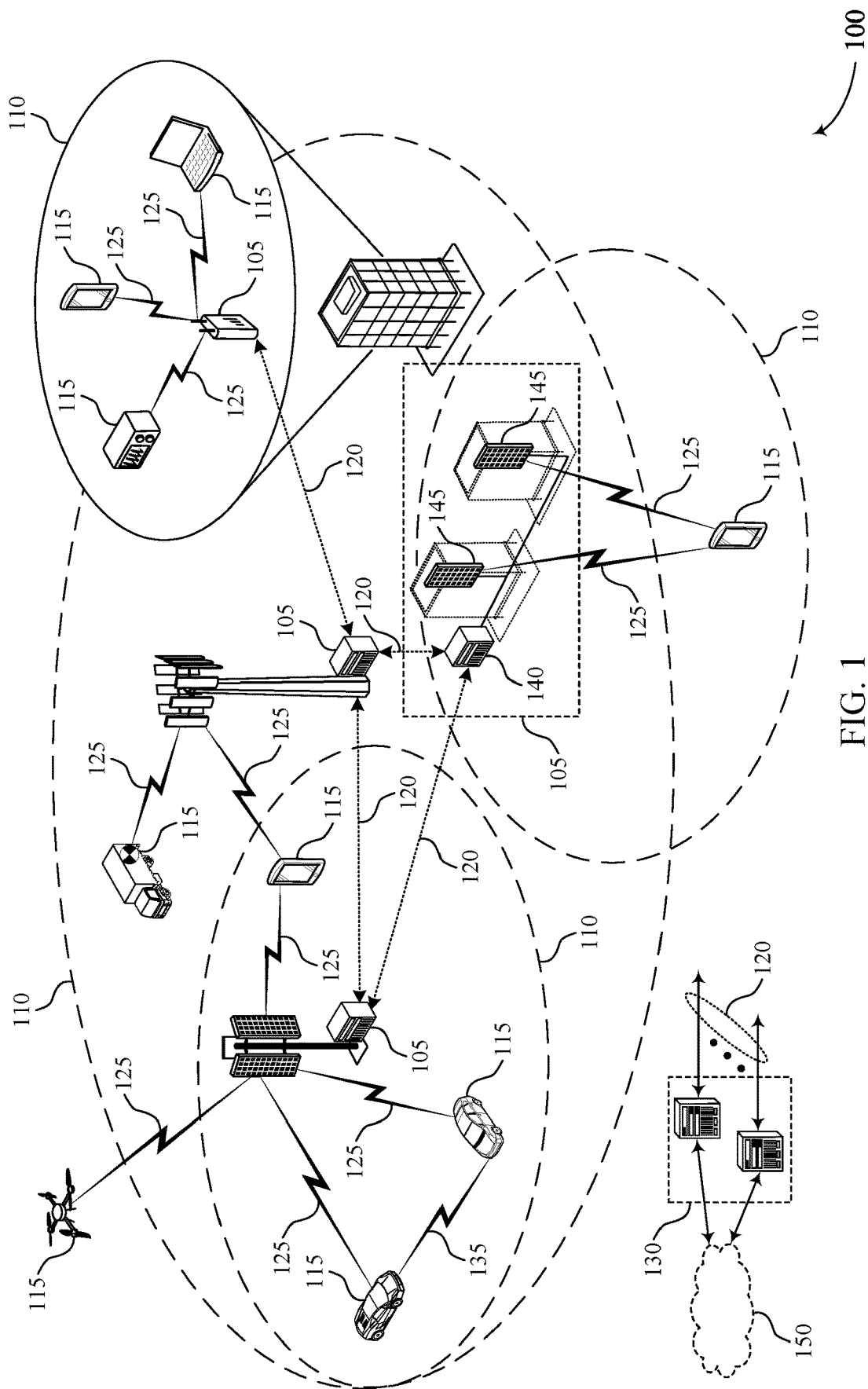
FIG. 1 illustrates an example of a wireless communications system that supports sensing report quantization for inter-user equipment coordination in accordance with aspects of the present disclosure.

Some wireless communications systems (e.g., 5G systems) may support sidelink communication links between UEs. Scheduling for the sidelink communication resources may not be managed by a central entity. As such, UEs may compete for resources in a sidelink network. Additionally, some sidelink networks may operate using half-duplex communication. Thus, when a UE is transmitting information over the sidelink channel, it may not be able to receive information over other sidelink channels. Such conditions (e.g., the competing for resources and the half-duplex communications) may result in inefficiencies in the allocation of communication resources and collisions between communications of different UEs. It may be desirable for UEs to communicate information about the availability of future communication resources (e.g., if a resource is preferred, non-preferred, or may be involved in a collision between two or more transmissions) that is separate from scheduling messages and feedback signaling (e.g., acknowledgement (ACK) messages and negative acknowledgement (NACK) messages). An assisting UE may provide such information in a coordination message over a sidelink channel. The coordination message may include indications of whether or not each sidelink resources from a set of candidate sidelink resources are available or not available. However, a single-bit report (e.g., using a single bit indication for each resource of the set of future resources) may not provide enough information for efficient use of available resources. That is, some resources may experience higher levels of interference than others, but may still be available for some communications. But a full resolution report for each of the future resources may not be efficient (e.g., may result in a large increase in signaling overhead). Improved quantization of coordination reporting may be beneficial.

A UE may generate statistical modeling of sensing outcomes (e.g., may identify one or more measurement statistics), and may transmit values that are quantized based on the one or more measurement statistics. Measurement statistics may include one or more of mean and variance of sensing results (e.g., channel quality measurements such as signal to interference ratio (SIR)), auto-correlation of measurements or measurement statistics over time, auto-covariance, or the like. In some examples, a UE may incorporate channel measurement statistics into a waveform (e.g., the coordination report) or otherwise compress the measurements. The UE may measure its own self-interference, and may indicate (e.g., in the coordination message) resource availability that reflects the measured self-interference. A receiving UE may use the coordination message to schedule subsequent sidelink communications (e.g., with the transmitting UE or with other UEs).

Aspects of the disclosure are initially described in the context of wireless communications systems. Aspects of the disclosure are further illustrated by and described with reference to wireless communications systems, coordination procedures, availability reports, and process flows. Aspects of the disclosure are further illustrated by and described with reference to apparatus diagrams, system diagrams, and flowcharts that relate to sensing report quantization for inter-user equipment coordination.

FIG. 1 illustrates an example of a wireless communications system 100 that supports sensing report quantization for inter-user equipment coordination in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may generate statistical modeling of sensing outcomes (e.g., may identify one or more measurement statistics), and may transmit values that are quantized based on the one or more measurement statistics. Measurement statistics may include one or more of mean and variance of sensing results (e.g., channel quality measurements such as signal to interference ratio (SIR)), auto-correlation of measurements or measurement statistics over time, auto-covariance, or the like. In some examples, the UE 115 may incorporate channel measurement statistics into a waveform (e.g., the coordination report) or otherwise compress the measurements. The UE 115 may measure its own self-interference, and may indicate (e.g., in the coordination message) resource availability that reflects the measured self-interference. A receiving UE may use the coordination message to schedule subsequent sidelink communications (e.g., with the transmitting UE 115 or with other UEs 115).

Figure 2:
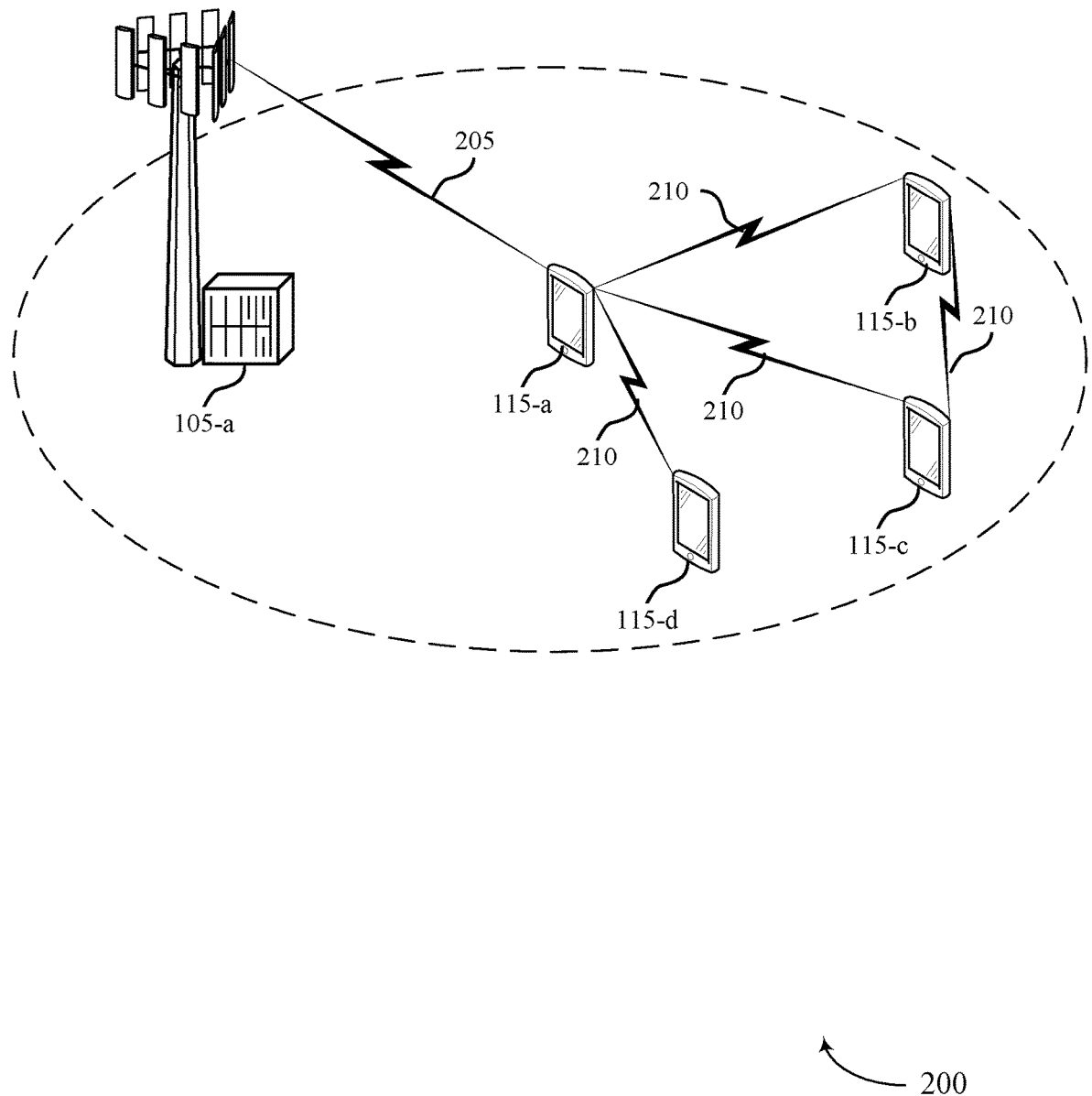
FIG. 2 illustrates an example of a wireless communications system that supports sensing report quantization for inter-user equipment coordination in accordance with aspects of the present disclosure.

FIG. 2 illustrates an example of a wireless communications system 200 that supports sensing report quantization for inter-user equipment coordination in accordance with aspects of the present disclosure. The wireless communications system 200 may include a base station 105-*a*, a UE 115-*a*, a UE 115-*b*, and a UE 115-*c*, which may be examples of corresponding devices described with reference to FIG. 1. In some examples, the base station 105-*a* may communicate with one or more UEs 115 via a bidirectional communication link 205 (e.g., via a Uu interface). In some examples, the UEs 115 may communicate with each other via a sidelink 210 (e.g., a PC5 interface).

In some examples, one or more UEs 115 may coordinate with each other to more efficiently allocate sidelink resources. For example, UEs 115 may compete for sidelink resources on a sidelink 210. Additionally, some sidelink networks may operate using half-duplex communication. Thus, when a UE 115 is transmitting information over the sidelink channel, it may not be able to receive information over other sidelink channels. Such conditions (e.g., the competing for resources and the half-duplex communications) may result in inefficiencies in the allocation of communication resources and collisions between communications of different UEs 115.

In some examples, UEs 115 may exchange information regarding the availability of future communication resources on sidelink 210 (e.g., if a resource is preferred, non-preferred, or may be involved in a collision between two or more transmissions) that is separate from scheduling messages and feedback signaling (e.g., acknowledgement (ACK) messages and negative acknowledgement (NACK) messages).

For example, the UE 115-*a* may be referred to as an assisting UE. The UE 115-*a* may perform resource sensing, as described in greater detail with reference to FIG. 3. The UE 115-*a* may identify an availability status (e.g., whether future sidelink resources are available, unavailable, preferred, non-preferred, etc.) for each resource of a set of future sidelink resources. The UE 115-*a* may then transmit a coordination message to one or more UEs 115 (e.g., UE 115-*b*). The coordination message may include indications of whether or not each sidelink resources from a set of candidate sidelink resources are available or not available. The UE 115-*b* may utilize the coordination message to select sidelink resources on which to transmit (e.g., to UE 115-*c*). The UE 115-*b* may avoid resources on which a collision would occur (e.g. resources that are already scheduled for a transmission, or experience interference above a threshold, or the like).

In some examples, one or more transmitting UEs 115 (e.g., UE 115-*b*) may be power-sensitive, and may not be able to afford sensing continuously on all resources. For instance, the UE 115-*a* in such examples may be a smart watch or other wearable device, a headphone or ear bud, or the like. In such examples, a receiving UE (e.g., UE 115-*a*) may be more capable in terms of power (e.g., may be a smart phone, streaming device, V2X device, or the like), and may perform the sensing procedures. The UE 115-*a* may report back resource availability information to the UE 115-*b*, and the UE 115-*b* may select available resources on which to communicate with the UE 115-*a*. In some examples, the UE 115-*b* may transmit a request for coordination reports from the UE 115-*a* (e.g., as described in greater detail with reference to FIG. 3). In some examples, the receiving UE (e.g., the UE 115-*a*) may be a receiver side device of a unicast or groupcast communications group, or any other UE 115 that assists in communication of other UEs 115 on the sidelink 210. For instance, the UE 115-*a* may be a scheduling UE, or may receiving scheduling information from one or more UEs 115. In some examples, as described herein, a UE 115-*b* may also perform one or more measurements during a sensing window, to determine availability for one or more future sidelink resources. Upon receiving a report from the UE 115-*a* indicating availability of the same set of one or more future sidelink resources, the UE 115-*b* may more accurately and efficiently determine sidelink resource availability. That is, the UE 115-*b* may at any time have at least two different views or perspectives on resource availability in a reservation window due to different locations of UE 115-*a* and UE 115-*b*. For instance, UE 115-*b* may sense or have access to information regarding a first set of UEs 115, and the UE 115-*a* may similarly sense or have access to information regarding a second set of UEs 115, and the different information may or may not be the same).

In some examples, the UE 115-*a* may generate a coordination report indicating which sidelink resources of a set of future resources are available for transmission for the UE 115-*b*. The UE 115-*a* may continuously sense sidelink resources during a measurement or sensing window. The UE 115-*a* may measure interference signal levels. For instance, the UE 115-*a* may measure a reference signal receive power (RSRP) from the UE 115-*c* (e.g., −92 dBm), and an RSRP from the UE 115-*d* (e.g., −102 dBm). In a last transmission from the UE 115-*b*, the UE 115-*a* may measure a target signal level (e.g., an RSRP of −90 dB). The UE 115-*a* may estimate an SIR for the UE 115-*b* and the UE 115-*c* (e.g., 2 dB) and an SIR for the UE 115-*b* and the UE 115-*d* (e.g., 12 dB). In such examples, the SIR for the UE 115-*b* and the UE 115-*d* may be large enough for reliable communications between the UE 115-*b* and the UE 115-*a*. The UE 115-*a* may indicate, in the coordination message, that the resources reserved by the UE 115-*d* are available to the UE 115-*b* for communications with the UE 115-*a*. In some examples, scheduling of communications may be based on whether the UE 115-*b* has more than one data stream with varying quality of service (QoS) requirements or transmissions with different MCS indices.

Thus, coordination messages may allow for more efficient utilization of available sidelink resources. Some resources may be available to more than one UE 115 depending on SIR for various subsets of the UEs 115. Use of other sidelink resources may result in an increase in collisions, increased interference, increased system latency, and decreased user experience. Inter-UE coordination (e.g., exchanging coordination messages).

However, a single-bit report (e.g., using a single bit indicating that each resource of the set of future resources is either available or unavailable) may not provide enough information for efficient use of available resources. That is, some resources may experience higher levels of interference than others, but may still be available for some communications. But a full resolution report for each of the future resources may not be efficient (e.g., may result in a large increase in signaling overhead). Improved quantization of coordination reporting may be beneficial.

As described in greater detail with reference to FIGS. 3-5, a UE 115 may generate statistical modeling of sensing outcomes (e.g., may identify one or more measurement statistics), and may transmit values that are quantized based on the one or more measurement statistics. Measurement statistics may include one or more of mean and variance of sensing results (e.g., channel quality measurements such as signal to interference ratio (SIR)), auto-correlation of measurements or measurement statistics over time, auto-covariance, or the like. In some examples, the UE 115 may incorporate channel measurement statistics into a waveform (e.g., the coordination report) or otherwise compress the measurements. The UE 115 may measure its own self-interference, and may indicate (e.g., in the coordination message) resource availability that reflects the measured self-interference. A receiving UE may use the coordination message to schedule subsequent sidelink communications (e.g., with the transmitting UE 115 or with other UEs 115).

Figure 3:
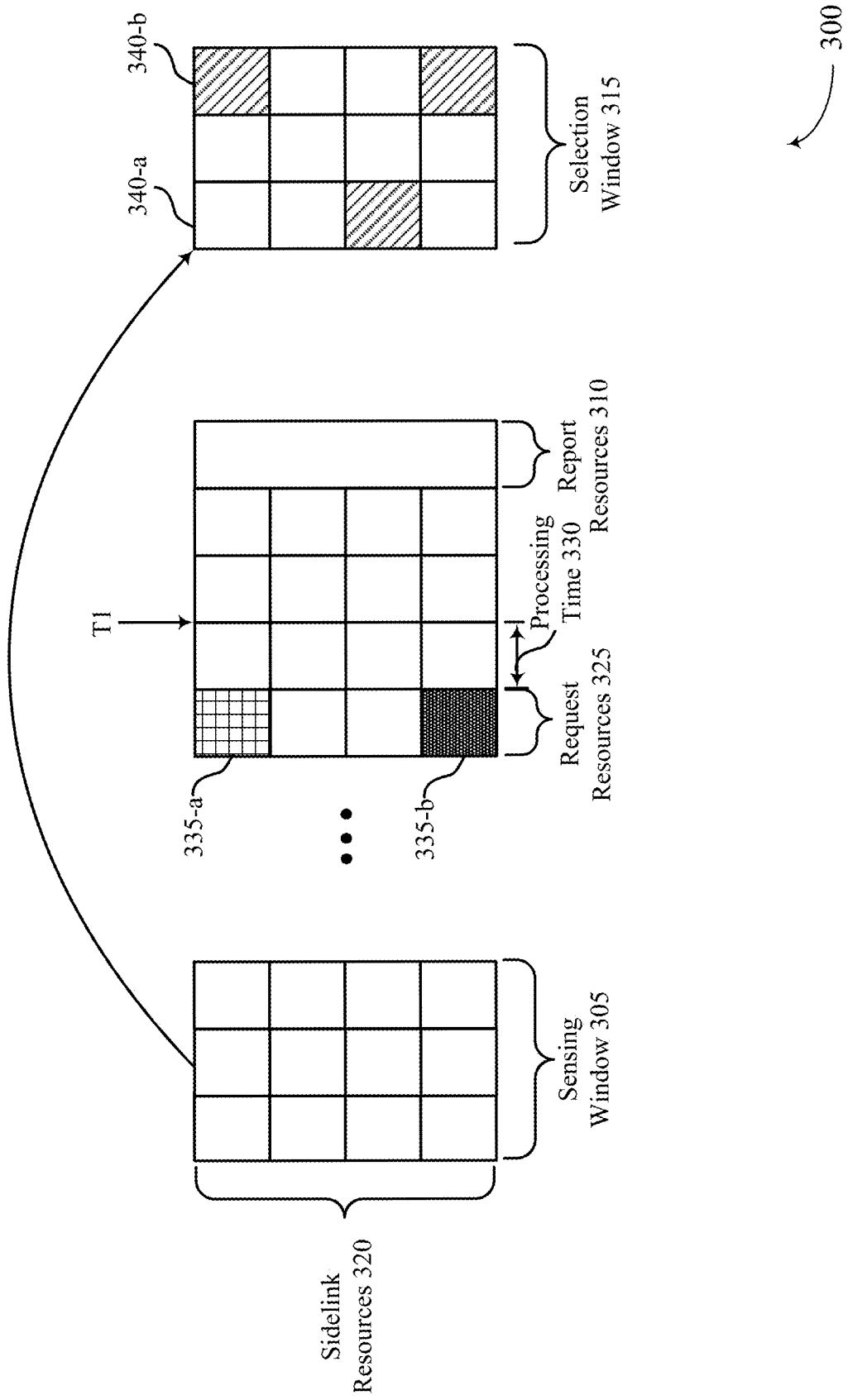
FIG. 3 illustrates an example of a coordination procedure that supports sensing report quantization for inter-user equipment coordination in accordance with aspects of the present disclosure.

FIG. 3 illustrates an example of a coordination procedure 300 that supports sensing report quantization for inter-user equipment coordination in accordance with aspects of the present disclosure. The coordination procedure 300 may be implemented by, or may implement aspects of, one or more wireless devices (e.g., UEs 115 or base stations 105), which may be corresponding devices described with reference to FIGS. 1-2.

In some examples, a helping UE 115 (e.g., the UE 115-a) may perform a coordination procedure 300. For instance, the helping UE 115 may perform sensing during sensing window 305, may report sensing results (e.g., in a coordination message) during report resources 310, and may indicate (e.g., in the coordination message) an availability status for resources in a selection window 315. In some examples, the helping UE 115 may initiate the coordination procedure 300 based on receiving a request from one or more other UEs 115 (e.g., a UE 115-b as described with reference to FIG. 2). The helping UE 115 may be instructed directly by a base station 105 (e.g., the base station 105-b as described with reference to FIG. 2) to perform the coordination procedure. In some examples, the helping UE 115 may continuously or periodically sense resources (e.g., during a sensing window 305) and may be triggered by one or more conditions or preconfigured to perform the coordination procedure 300. In some examples, the helping UE 115 may, based on locally available information, decide to transmit inter-UE coordination messages (e.g., without being triggered, instructed, or requested).

During the sensing window 305, the helping UE 115 may monitor sidelink resources 320, receive transmissions from one or more other UEs 115, receive or transmit scheduling requests from one or more other UEs 115, receive scheduling information from a base station 105, or receive one or more reference signals from one or more neighboring UEs 115. The UE 115 may perform measurements on received reference signals or sidelink data or control signaling, and may identity interference levels between various combinations of UEs 115 during resources of selection window 315. The helping UE 115 may identify resources of selection window 315 during which the helping UE 115 or other UEs 115 are scheduled for subsequent sidelink transmissions.

During request resources 325, the helping UE 115 may receive one or more requests from other UEs 115. For instance, the helping UE 115 may receive a first request 335-a from a first UE 115 and a second request 335-b from a second UE 115. Each of the first and second requests may trigger reporting of the results from sensing window 305 (e.g., transmission of a coordination message during report resources 310). After processing time 330, at time T1, the helping UE 115 may generate the coordination message based on having received the requests 335 during request resources 325. The helping UE 115 may transmit the coordination message (e.g., to the requesting UEs 115) during report resources 310.

The coordination message may include an indication of an availability status for each sidelink resources 340 in the selection window 315. The helping UE 115 may, for instance, indicate that the sidelink resource 340-a is available, but that the sidelink resource 340-b is unavailable for transmissions by one or more transmitting UEs 115. In some examples, the helping UE 115 may broadcast a coordination message. In some examples, the UE 115-a may transmit multiple coordination messages with UE-specific coordination information (e.g., resource availability status information) directly to individual UEs 115. Each coordination message may be different, indicating which sidelink resources during the selection widow 315 the transmitting UE is permitted to utilize.

In some examples (e.g., in mode 2 random access), a resource selection window may be chosen by a helping UE 115. In such examples, a gap between resource selection triggering time and an end of a resource selection window may be smaller than or equal to a packet delay budget (PDB) of a packet. A staring point of a selection window in such examples may be an offset after a selection is triggered. The value of the offset may be selected by the UE 115.

In some examples, the coordination message may include single-bit reports for each sidelink resource 340 in the selection window 315, as illustrated with reference to FIG. 4. However, a single-bit report (e.g., using a single bit indicating that each resource of the set of future resources is either available or unavailable) may not provide enough information for efficient use of available resources. That is, some resources may experience higher levels of interference than others, but may still be available for some communications.

In some examples, the coordination message may include a multi-bit report for each sidelink resource 340 in the selection window. But a full resolution report for each of the sidelink resources 340 may not be efficient (e.g., may result in a large increase in signaling overhead). Improved quantization of coordination reporting may be beneficial.

As described in greater detail with reference to FIGS. 4-5, a UE 115 may generate statistical modeling of sensing outcomes (e.g., may identify one or more measurement statistics), and may transmit values that are quantized based on the one or more measurement statistics. Measurement statistics may include one or more of mean and variance of sensing results (e.g., channel quality measurements such as signal to interference ratio (SIR) determined based on sensing performed during a sensing window 305), auto-correlation of measurements or measurement statistics over time, auto-covariance, or the like. In some examples, the UE 115 may incorporate channel measurement statistics into a waveform (e.g., the coordination report) or otherwise compress the measurements. The UE 115 may measure its own self-interference, and may indicate (e.g., in the coordination message) resource availability that reflects the measured self-interference. A receiving UE may use the coordination message to schedule subsequent sidelink communications (e.g., with the transmitting UE 115 or with other UEs 115).

Figure 4:
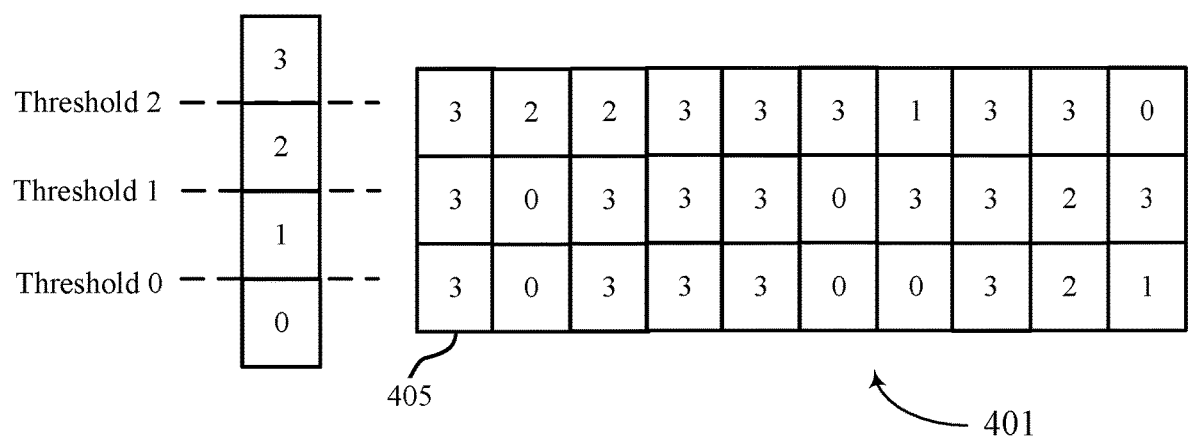
FIG. 4 illustrates examples of availability reports that supports sensing report quantization for inter-user equipment coordination in accordance with aspects of the present disclosure.

FIG. 4 illustrates examples of availability reports 400 and 401 that supports sensing report quantization for inter-user equipment coordination in accordance with aspects of the present disclosure. In some examples, availability reports 400 and 401 may be implemented by one or more wireless devices, such as UEs 115, which may be examples of corresponding devices described with reference to FIGS. 1-3.

In some examples, a UE 115 may transmit an availability report 401 that includes binary indications of resource availability. For instance, for each sidelink resource 405, the UE 115 may indicate whether the resource is available for use by another UE 115, or unavailable for use by the other UE 115. For instance, if the bit is set to 0, then the sidelink resource 405 may be unavailable. If the bit is set to 1, then the sidelink resource 405 may be available. However, as discussed herein, such a binary system may not account for different levels of availability, different levels of interference, different SIRs for different UEs 115, or the like. This may result in less efficient use of a sidelink channel (e.g., various sidelink resources 405 that could be utilized by at least a subset of local UEs 115 may remain unused).

In some examples, a UE 115 may transmit an availability report that contains soft resource availability information. In such examples, for each resource (e.g., in a selection window 315) the UE 115 may indicate $2^N$ different availability statuses (e.g., levels of availability) by using N bits (e.g., instead of one bit). The number of bits N may be preconfigured for reporting UEs, dynamically set by a transmitting UE 115 in a request for a report. That is, a UE 115-*b* (e.g., as described with reference to FIG. 2) may transmit a request message to a UE 115-*a*. In the request message, the UE 115-*b* may request a coordination message (e.g., including an availability report 401), and may further indicate a value for N. In some examples, the value for N may be dynamically determined as a function of multiple RSRP measurements configured by the UE 115-*b*, a base station 105-*b*, or both. In some examples, the value for N may be dynamically determined by the UE 115-*a* and reported back to the UE 115-*b*.

In some examples, the value of N may be adjusted (e.g., increased or decreased) based on one or more parameters. The one or more parameters may include a number of modulation coding scheme (MCS) levels used by the UE 115-*b* (e.g., the transmitting UE 115), a number of priority levels of packets of the UE 115-*b*, a latency (e.g., a packet delay budget) threshold for the UE 115-*b*, a reliability requirement for the UE 115-*b*, a number of subchannels occupied by the reporting phase, a power control level used by the UE 115-*b*, a communication range requirement of the UE 115-*b* and the UE 115-*a*, a distance or radio frequency distance of the UE 115-*a* and the UE 115-*b*, zone identifiers of the UE 115-*a* and the UE 115-*b*, a cast type of communication (e.g., unicast, groupcast, broadcast, or the like) between the UE 115-*b* and the UE 115-*a*, a channel busy ratio (CBR) measured by one or both of the UE 115-*a* and the UE 115-*b*, whether HARQ-ACK is utilized or not, or any combination thereof.

The availability report 401 may include soft resource availability information according to multiple levels (e.g., up to N bits). For instance, for N=2 (e.g., 4 levels), the UE 115-*a* may indicate four different availability statuses (e.g., where 0 indicates that a resource is definitely not available, 1 indicates that a resource is weakly not available or non-preferred, 2 indicates that a resource is weakly available or preferred, and 3 indicates that a resource is definitely available). In some examples, the UE 115-*a* may generate the soft availability information based on estimated SIR on a target link (e.g., between the UE 115-*a* and the UE 115-*b*) due to an interfering transmission signal from a UE 115-*c*. For instance, the SIR between the UE 115-*b* and the UE 115-*c* (e.g., for a transmission from the UE 115-*b* t the UE 115-*c*) may be calculated as an interference measurement between the UE 115-*a* and the UE 115-*b* minus an interference measurement between the UE 115-*a* and the UE 115-*c*. In some examples, the interference measurements may be RSRP measurements, reference signal receive quality (RSRQ) measurements, or the like.

In some examples, the UE 115-*b* (e.g., that receives the coordination message including the availability report 401) may utilize the received N-bit report based on the one or more parameters. The one or more parameters may include a number of MCS levels used by the UE 115-*b* (e.g., for a higher MCS index a resource may be assumed to be unavailable while the same resource may be assumed to be available for a lower index), a number of priority levels of packets of the UE 115-*b*, a latency (e.g., a packet delay budget) threshold for the UE 115-*b*, a reliability requirement for the UE 115-*b*, a number of subchannels occupied by the reporting phase, a power control level used by the UE 115-*b* (e.g., for lower transmit power levels, the UE 115-*b* may use only resources that are available with high reliability or definitely available), a communication range requirement of the UE 115-*b* and the UE 115-*a*, a distance or radio frequency distance of the UE 115-*a* and the UE 115-*b*, zone identifiers of the UE 115-*a* and the UE 115-*b*, a cast type of communication (e.g., unicast, groupcast, broadcast, or the like) between the UE 115-*b* and the UE 115-*a*, a channel busy ratio (CBR) measured by one or both of the UE 115-*a* and the UE 115-*b*, whether HARQ-ACK is utilized or not, or any combination thereof.

In some examples, the N-bit availability information may be combined with M-bit information that is present at the UE 115-*b* by mapping the coarser information (e.g., the minimum between M and N) to the finer information bit depth or vice versa. When the UE 115-*b* has no sensing results of its own, it may make decision based only on a coordination report 401 received for the UE 115-*a*. In some examples, the UE 115-*b* may receive the coordination report 401, and may combine it with its own view (e.g., its own sensing results) to generate a complete or more accurate set of availability statuses for the sidelink resources 405 in the selection window.

In some examples, the availability statuses (e.g., 0, 1, 2, or 3) may be based on one or more threshold values (e.g., SIR thresholds). For instance, the UE 115-*a* may indicate that a sidelink resource 405 has an availability status of 0 (e.g., is available for a transmissions from the UE 115-*b* to the UE 115-*c*) if the SIR for the target link (e.g., between the UE 115-*b* and the UE 115-*c*) satisfies threshold 0. Similarly, the sidelink resource 405 may have an availability status of 1 if the SIR for the target link satisfies threshold 1, may have an availability status of 2 if the SIR for the target link satisfies threshold 2, and may have an availability status of 3 if the SIR for the target link exceeds threshold 2 (e.g., or satisfies a threshold 3).

In some examples, the thresholds may be flexible. For example, fixed threshold values may result in inefficient use of available resources, and poor communication of availability status. Instead, as described in greater detail with reference to FIG. 5, the UE 115-*a* may utilize flexible quantization levels for determining an availability status for each sidelink resource 405. The UE 115-*a* may quantize sensing outcome reports for an inter-UE coordination procedure. Quantization of sensing outcomes may facilitate more accurate and soft reporting, which may result in a receiving UE 115 (e.g., the UE 115-*b* or the UE 115-*c*), or a central UE 115 or central unit that collects and reports sensing data, to identify unused or available sidelink resources 405 more efficiently.

Flexible quantization levels for sensing outcomes based on statistical modeling may allow for more precise indications of resource availability. For instance, in some examples, a channel quality measurement variable (e.g., RSRP, RSRQ, or the like) may take a value from Y=0 to Y=5. I the thresholds are fixed and binary, then the thresholds may define availability statuses such that any measurement variable Y between 0 and 2.5 results in an availability status of 0 and any channel measurement variable Y between 2.5 and 5 results in an availability status of 1. In such an example, the UE 115-*a* may perform one or more measurements, and may generate measurement values of 3.1, 3.2, 3.3, and 3.4 (e.g., for respective sidelink resource 405). Despite the variance of the measurements, each of these sidelink resources may be assigned an availability status of 1 (e.g., using an RSRP threshold of 2.5). If the quantization level were fixed and 2-bit, then the availability statuses of the measured sidelink resources would still be the same (e.g., falling between a threshold at Y=3 and Y=4). However, by utilizing flexible quantization levels based on measurement statistics (e.g., mean and variance of channel quality measurements), the differences between sidelink resources 405 (e.g., having a measurement value of 3.1 or 3.4) may be accurately reflected in the availability statuses, resulting in more efficient selection and use of sidelink resources 405 by a transmitting UE 115-b.

Techniques described herein, as described in greater detail with reference to FIG. 5, may rely on statistical modeling of sensing outcomes (e.g., identifying one or more measurement statistics including mean, variance, auto-correlation, auto-covariance, or the like), measurement and consideration of self-interference (e.g., in a full-duplex (FD) mode), or the like, to accurately reflect sidelink resource availability in a coordination message.

Figure 5:
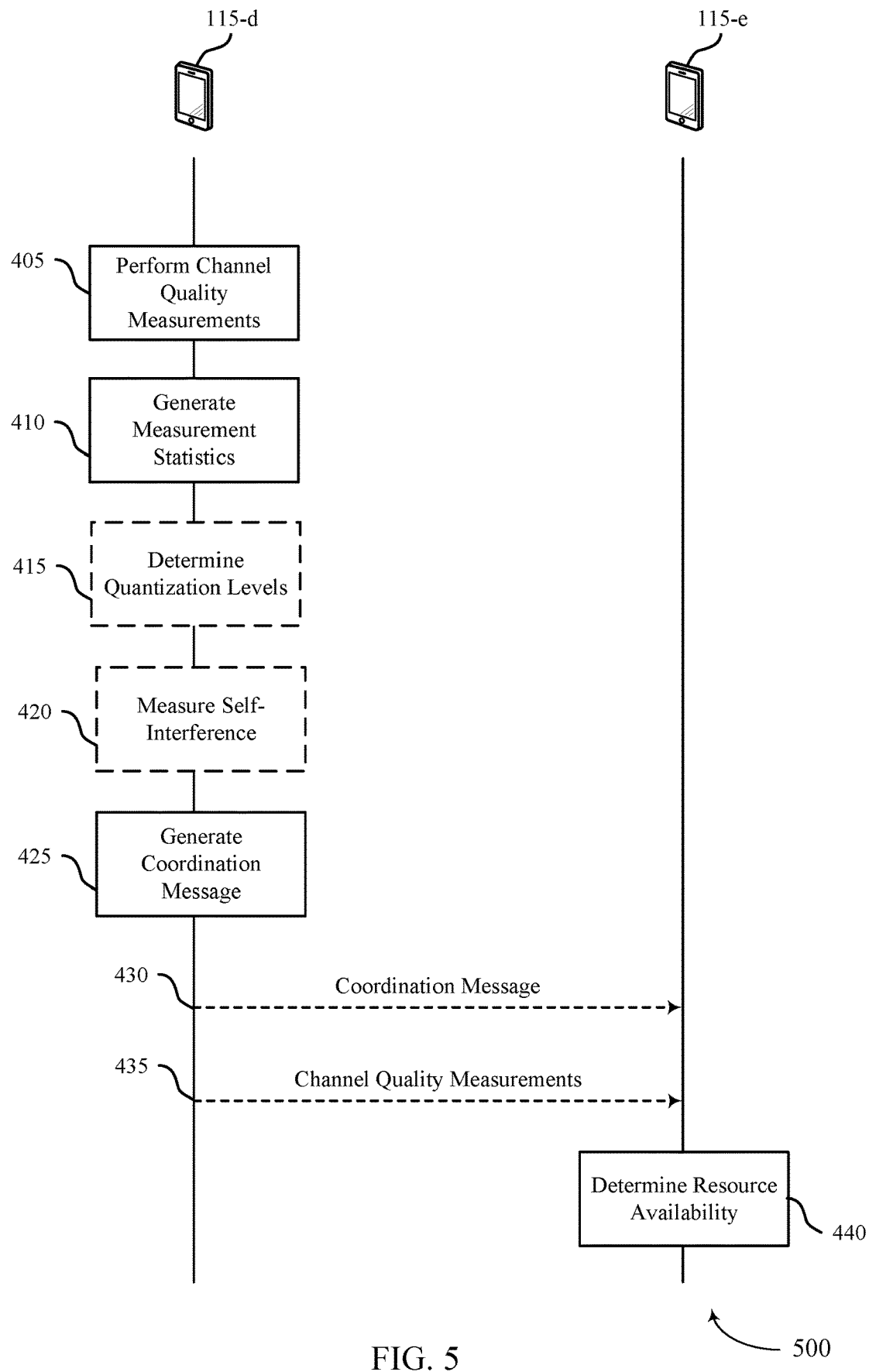
FIG. 5 illustrates an example of a process flow that supports sensing report quantization for inter-user equipment coordination in accordance with aspects of the present disclosure.

FIG. 5 illustrates an example of a process flow 500 that supports sensing report quantization for inter-user equipment coordination in accordance with aspects of the present disclosure. Process flow 500 may include a UE 115-d and a UE 115-e, which may be examples of corresponding devices described with reference to FIGS. 1-4. In some examples, the UE 115-d may generate and transmit a coordination message. The coordination message may include an availability report (e.g., an availability report 401). In some examples, the UE 115-e may trigger the generation of the coordination message (e.g., by transmitting a request message to the UE 115-d). For instance, the UE 115-e may prepare sidelink communications for transmission to another UE 115-e, but may request resource availability information from the UE 115-d to determine sidelink resources on which to send the sidelink communications. In some examples, the UE 115-d may receive a triggering message from a base station 105 instructing the UE 115-d to generate and transmit the coordination message. In some examples, the UE 115-d may autonomously generate and transmit the coordination message (e.g., based on one or more rules, scheduled transmissions satisfying a threshold number of scheduled transmissions of utilized sidelink resources, or the like).

At 405, the UE 115-d may perform one or more channel quality measurements. The UE 115-d may perform the channel quality measurements during a selection window including multiple resources. The UE 115-d may perform measurements on a target link (e.g., between the UE 115-e and a target UE 115, such as the UE 115-d or another UE 115). The channel quality measurements may include RSRP, RSRQ, SIR (e.g., based on measured RSRP or R SRQ), SNR, or the like.

At 410, the UE 115-d may generate one or more measurement statistics (e.g., for the sidelink resources on which the measurements were performed at 405). The measurement statistics may include a mean channel quality measurement, variance of the channel quality measurements cross the sidelink resources (e.g., of the sensing window), or the like. In some examples, the variance may be a standard deviation, or the like. In some examples the variance may be preconfigured, indicated in a request (e.g., received from the UE 115-e). In some examples, the measurement statistics may include autocorrelation or cross-correlation of measurements over time, or the like.

At 415, the UE 115-d may determine a set of quantization levels, each quantization level based on the channel quality measurement statistics (e.g., the mean and the variance, or the like). For example, the UE 115-d may share soft information for channel quality measurements (e.g., RSRP, RSRQ, SIR, or the like) based on quantization levels associated with different mean and variance values. The top of a vector of RSRP levels, adding just the RSRP level for the intended or target link (e.g., between the UE 115-e and a receiving UE 115) in the availability report may give all relevant channel measurement values (e.g., SIR values) to the UE 115-e.

In some examples, quantization levels may be defined by taking the channel quality measurement values minus an average channel quality measurement value. this may result in the quantization levels being defined relative to the man, which may result in more general and efficient quantization. In some examples, the quantization levels may be non-binary. For instance, the UE 115-d may support $2^N$ different availability statuses (e.g., levels of availability) by using N bits (e.g., instead of one bit). In an example where N=2, the UE 115-d may generate availability statuses for each sidelink resource of a set of future sidelink resources (e.g., based on the channel quality measurement statistics), where teach availability status is selected from four candidate availability statuses. The quantization between availability statuses may be based on the channel measurement statistics. For instance, each quantization level may be defined in terms of a mean channel quality measurement a variance from μ (e.g., a standard deviation σ), and a variable (e.g., a multiplier or fixed variable to adjusting the size of the variance). For the four availability statuses (e.g., 0, 1, 2, and 3), quantization levels may be defined as follows. For a variable β≥1, a first quantization level 0 may be defined as channel measurement values between 0 and μ−βσ, a second quantization level 1 may be defined as channel measurement values between μ−βσ and μ, a third quantization level 2 may be defined as channel measurement values between μ and μ+βσ and a fourth quantization level 4 may be defined as channel measurement values that are greater than μ+βσ.

In such examples, the UE 115-d may use two bits for each quantization level based on the measurements and values for μ, β, and σ. The UE 115-d may generate a grid including two-bit indicators for each resource of the set of resources, and may include the grid in the coordination message.

In some examples, the UE 115-d may observe RSRP levels (e.g., as low as −107 dBm and as high as −50 dBm) in inter-UE coordination evaluations (e.g., channel quality measurements performed during the sensing window). This may result in high ranges of RSRP or SIR levels in practical cases (e.g., for a Uma type layout with a large number of transmitter and receiver UEs). In such examples the large spread of channel quality measurements may be accurately and effectively indicated in a coordination message with quantization levels based on mean and variance channel quality measurement statistics.

In some examples, the quantization may be uniform. For instance, there may be a same number of quantization levels above the mean channel quality measurement and below the mean channel quality measurement. In some examples the quantization levels may be non-uniform. In such examples, N quantization levels may be used for values grater than the mean and M quantization levels may be used for values that are less than the mean. M and N may or may not be equal to each other. In some examples, a delta value or variance value may be configured (e.g., by another UE 115 or a base station 105), preconfigured (e.g., by a manufacturer), or included in one or more standards documents. In some examples, the delta value (e.g., a) may be a fixed value, a standard deviation, or the like.

Quantitation levels may be based on a normalizing procedure. For example, the UE 115-*d* may perform uniform quantization after adjusting the signal (e.g., adjusting a coordination message including the availability report) using the mean and the variance. For example, a threshold value (e.g., a maximum value) for the channel quality measurement values may be considered to be as much as infinity. The UE 115-*d* may generate a vector including the set of channel quality measurements with a size M×1. The UE 115-*d* may subtract the vector of channel quality measurements from the vector mean. The UE 115-*d* may normalize over a variance (e.g., standard deviation a). In such examples, the new vector may lie between −3σ and 3σ (with a high probably). The quantization may then be defined, as described herein, with reference to the mean μ and the σ of the new vector.

In some examples, the UE 115-*d* may utilize mean channel quality measurements, variance of channel quality measurements, and a differential channel quality measurement value. For example, the UE 115-*d* may report (e.g., in a coordination message transmitted at 430) a channel quality measurement mean, channel quality measurement autocorrelation, cross-correlation, or any combination thereof. For example, the UE 115-*d* may determine a cross-correlation value every T time units (e.g., slots, mini-slots, frames, subframes, symbols, or the like). The cross-correlation value may indicate a variance over time. In some examples, the cross-correlation value or autocorrelation value over time may be applied to one or more thresholds to generate channel availability statuses for the set of future sidelink resources.

In some examples, the UE 115-*d* may input one or more channel quality measurement statistics into a neural network. For instance, the UE 115-*d* may input, into the neural network, a mean channel quality measurement value, an autocorrelation value, a cross-correlation value, one or more current or previously determined grids of channel availability information (e.g., soft channel availability information, such as an availability report 401). In some examples, the output of the neural network may be applied to a quantizer, resulting in an updated or current availability report (e.g., set of availability statuses for the set of resources). In some examples, the UE 115-*d* may generate a vector including the set of channel quality measurements or the cross-correlation value, or the like. The matrix may have a size M×1. The UE 115-*d* may apply (e.g., may subtract) the mean channel quality measurement from each element of the matrix. The UE 115-*d* may apply the resulting updated matrix to a one-bit quantizer, resulting in a single-bit indicator for each potentially available future sidelink resource (e.g., that is based on the co-variance or the cross-correlation).

At 425, the UE 115-*d* may generate the coordination message. In some example, the UE 115-*d* may use a wavelet (e.g., DFT) to convert the collected sensing information across resources. For instance, the UE 115-*d* may generate a DFT waveform that incorporates the results of the sensing, one or more channel measurement statistics, or the like. The UE 115-*d* may generate a vector L having a size of M×1 that includes the sensing data. The UE 115-*d* may perform a DFT procedure on the vector L, and may determine whether the outputs have a correlation that satisfies a threshold value. If values in the vector L satisfy the threshold (e.g., many resources have similar availability statuses or measurement values), then the output of the DFT may be sparse. In such examples, the UE 115-*d* may include, in the coordination message generated at 425, a number of non-zero elements, and their location and value in the DFT domain. Upon receiving such a coordination message, the UE 115-*e* may determine that the elements in the DFT domain that have non-zero values satisfy a threshold (e.g., correspond to sidelink resources that are or are not available), and that the elements in the DFT domain that do not have non-zero values satisfy a different threshold (e.g., correspond to sidelink resources that are or are not available).

In some examples, the UE may use a modulation technique to generate the coordination message. For example, the UE 115-*d* may generate a vector L of size M×1, where M represents a number of sensed resources per report. The UE 115-*d* may consider the vector L to be a time-domain signal (e.g., may generate a time domain waveform representing the vector L). The UE 115-*d* may apply a quantizer to the vector L. For instance, the UE 115-*d* may apply a 1-bit quantizer (e.g., a sigma-delta quantizer). The UE 115-*d* may perform an fast Fourier Transform (FFT) operation on the vector L, and may determine if a bandwidth satisfies a threshold (e.g., whether the bandwidth is too low). If the bandwidth satisfies the threshold, then the UE 115-*d* may perform the sigma-delta quantization, and may transmit the binary values along the bandwidth. If the bandwidth does not satisfy the threshold, then compression may be useless. In some examples, the UE 115-*d* may determine whether the bandwidth satisfies the threshold, or may determine whether compression is a viable option, or may apply the 1-bit quantizer and transmit the binary values on the bandwidth, based at least in part on one or more rules, which may be indicated to the UE 115-*d* by another UE 115 or a base station, or may be included in one or more standards documents, or may be preconfigured at the UE 115-*d*, or any combination thereof.

At 430, the UE 115-*d* may transmit the coordination message to the UE 115-*e*. The coordination message may include an availability report, with an indication, for each of a set of sidelink resources in a selection window, of an availability status. The availability statuses may correspond to quantization levels (e.g., determined at 415). The coordination message may be broadcast, unicast, groupcast, multicast, or the like.

In some examples, the UE 115-*d* may dynamically determine whether or not to perform a compression procedure on the channel quality measurements or the channel quality measurement statistics. The UE 115-*d* may attempt to perform a compression procedure (e.g., a DFT procedure) to the channel quality measurements or statistics. If the compression is successful, the UE 115-*d* may transmit the coordination message at 430. In some examples, the UE 115-*d* may also transmit a dynamic indicator that the coordination message includes the resource availability statuses (e.g., compression was successful). If the compression is unsuccessful, then the UE 115-*d* may transmit a dynamic indication that compression was not supported (e.g., at 435), and may transmit channel quality measurements (e.g., raw data, instead of availability statuses). Upon receiving the raw data at 435, the UE 115-*e* may determine resource availability based on the raw data at 440. In some examples, the UE 115-*d* may transmit an indication of a message type (e.g., whether the coordination message transmitted at 430 includes compressed information and availability statuses, or whether a coordination message transmitted at 435 includes raw data) in a sidelink control information (SCI) message. The UE 115-*d* may then transmit a coordination message or raw data on a physical downlink shared channel (PDSCH) according to the message type indicated in the SCI.

In some examples, the UE 115-d may signal its own self-interference power so that the UE 115-e may more accurately select available resources. The UE 115-d may indicate the self-interference power so that the UE 115-e may use this information in selecting available resources in case of the UE 115-d operating in a full duplex mode in one of the upcoming transmissions (e.g., prior to a self-interference report). In some examples, if the UE 115-d is operating in a full duplex mode, then it might generate interference for the UE 115-e. The UE 115-d may add a potential impact of interference to the coordination message before sending the report or computing the differential RSRP or sidelink interference, or a channel quality measurement (e.g., RSRP) table in general. For example, if the UE 115-d is operating in full duplex mode, then it may add the impact of the self-loop interference by dividing channel quality measurements (e.g., RSRP) over a predicted or expected self-interference power. In some examples, the UE 115-d may add a margin or offset as needed (e.g., based on preconfiguration, or as determined autonomously by the UE 115-d, or as instructed by another device such as a UE 115 or a bas station 105). The UE 115-d may then transmit a modified coordination message (e.g., at 430) based on the updates from the self-interference information. The UE 115-d may transmit the modified report along with one or more channel quality measurement statistics (e.g., mean, variance, etc.) of the modified channel quality measurement (e.g., RSRP) table. This may indicate, to the UE 115-e, both RSRP/SIR/RSRQ, etc., as well as self-loop interference. In some examples, the UE 115-d may simply transmit a self-interference channel power to the UE 115-e (e.g., in the coordination message), and the UE 115-e may adjust accordingly (e.g., may select available sidelink resources to avoid interference from the UE 115-d).

At 435, the UE 115-e may determine resource availability based at least in part on the coordination message received at 430 (e.g., or the raw channel quality measurements received at 435). In some examples, the UE 115-e may receive multiple coordination messages (e.g., from multiple UEs 115). The UE 115-d may combine the received reports to determine available resources for transmitting sidelink communications to another UE 115. In some example, the UE 115-d may include, in the coordination message, an indication of self-interference, or of a self-interference channel power. In such examples, the UE 115-e may take the self-interference of the UE 115-d into account when determining available resources. In some examples, adjusting resource selection based on an indication of self-interference from the UE 115-d may be implemented or not based on whether the UE 115-d, the UE 115-e, or both, are operating in a full duplex mode.

Figure 6:
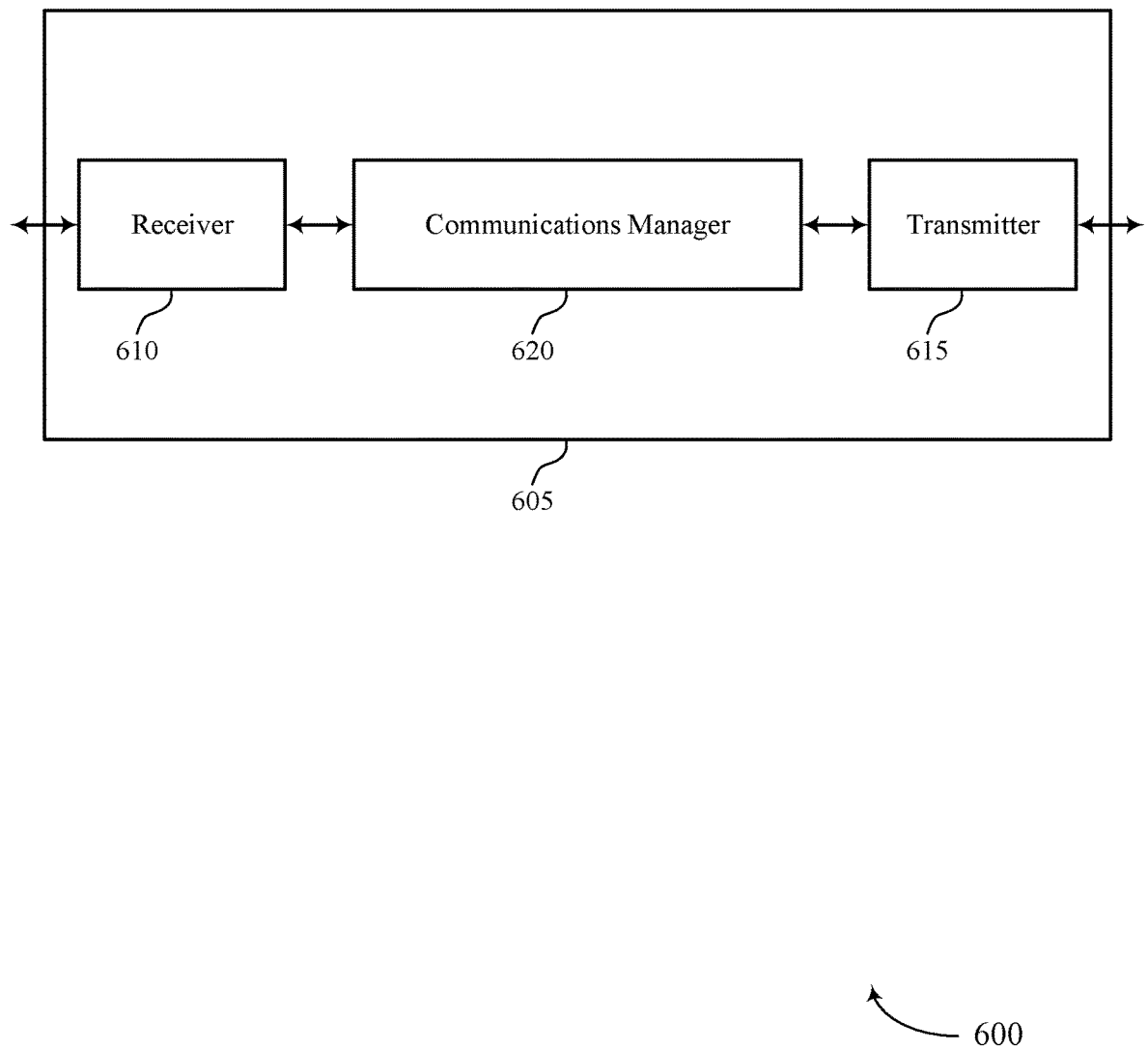
FIGS. 6 and 7 show block diagrams of devices that support sensing report quantization for inter-user equipment coordination in accordance with aspects of the present disclosure.

FIG. 6 shows a block diagram 600 of a device 605 that supports sensing report quantization for inter-user equipment coordination in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sensing report quantization for inter-user equipment coordination). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sensing report quantization for inter-user equipment coordination). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sensing report quantization for inter-user equipment coordination as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for performing, during a selection window including a set of multiple sidelink resources, one or more channel quality measurements. The communications manager 620 may be configured as or otherwise support a means for generating, basing at least in part on the one or more channel quality measurements, one or more measurement statistics for the set of multiple sidelink resources. The communications manager 620 may be configured as or otherwise support a means for transmitting, to a second UE, a coordination message including a set of multiple availability statuses for each of the set of multiple sidelink resources, each availability status associated with a quantization level, where the quantization level is based on the one or more measurement statistics.

Additionally, or alternatively, the communications manager 620 may support wireless communications at a second UE in accordance with examples as disclosed herein. For example, the communications manager 620 may be configured as or otherwise support a means for receiving, from a first UE, a coordination message including a set of multiple availability statuses for each of a set of multiple sidelink resources, each availability status associated with a quantization level, where each quantization level is based on the one or more measurement statistics. The communications manager 620 may be configured as or otherwise support a means for determining an availability status of the set of multiple sidelink resources based on the coordination message and the quantization levels. The communications manager 620 may be configured as or otherwise support a means for communicating on one or more of the set of multiple sidelink resources based on the determined availability statuses.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for inter-UE coordination resulting in more efficient use of available resources, decreased latency, decreased interference, improved reliability of communications, and improved user experience.

Figure 7:
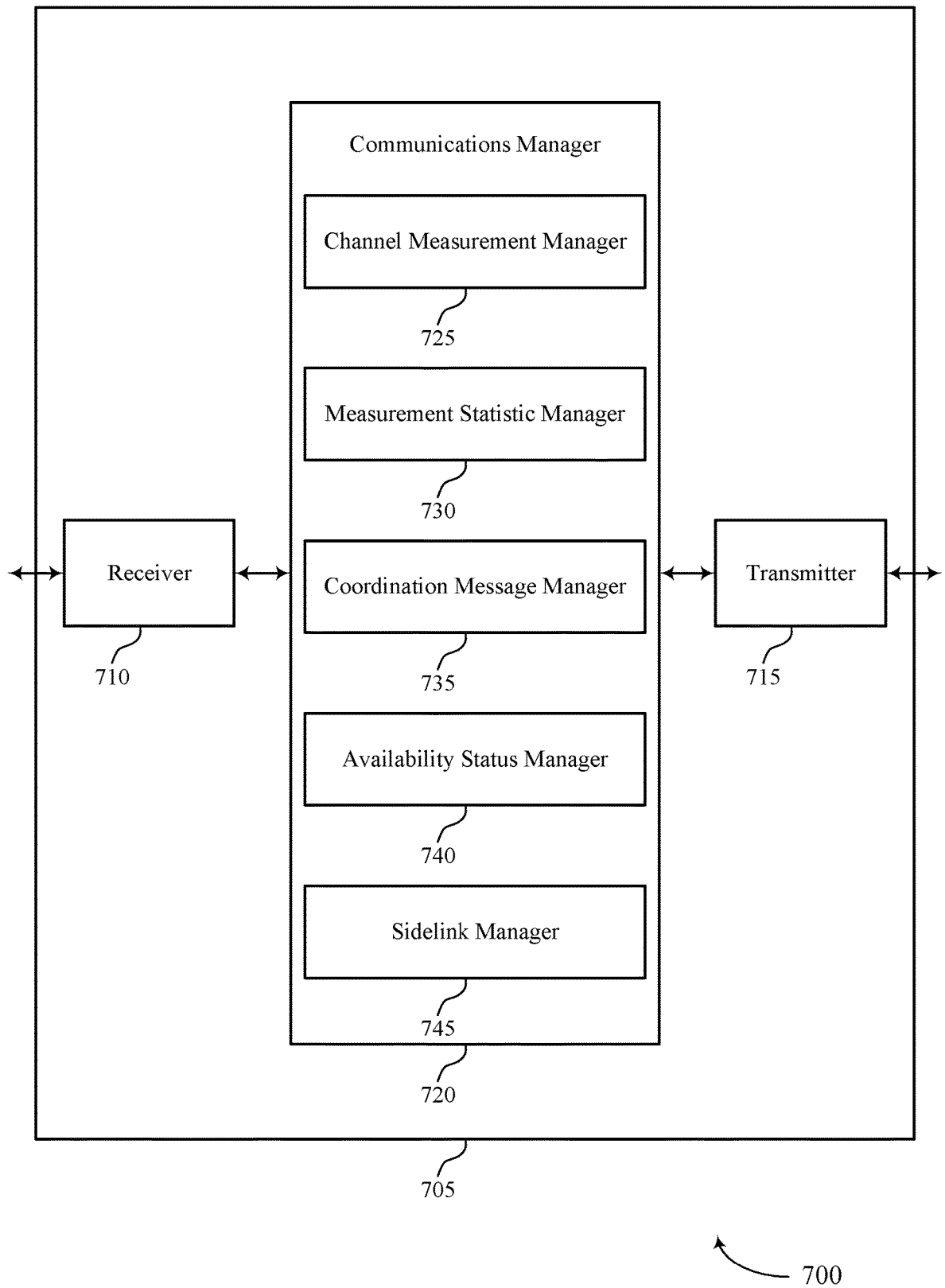

FIG. 7 shows a block diagram 700 of a device 705 that supports sensing report quantization for inter-user equipment coordination in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sensing report quantization for inter-user equipment coordination). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sensing report quantization for inter-user equipment coordination). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sensing report quantization for inter-user equipment coordination as described herein. For example, the communications manager 720 may include a channel measurement manager 725, a measurement statistic manager 730, a coordination message manager 735, an availability status manager 740, a sidelink manager 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The channel measurement manager 725 may be configured as or otherwise support a means for performing, during a selection window including a set of multiple sidelink resources, one or more channel quality measurements. The measurement statistic manager 730 may be configured as or otherwise support a means for generating, based on the one or more channel quality measurements, one or more measurement statistics for the set of multiple sidelink resources. The coordination message manager 735 may be configured as or otherwise support a means for transmitting, to a second UE, a coordination message including a set of multiple availability statuses for each of the set of multiple sidelink resources, each availability status associated with a quantization level, where the quantization level is based on the one or more measurement statistics.

Additionally, or alternatively, the communications manager 720 may support wireless communications at a second UE in accordance with examples as disclosed herein. The coordination message manager 735 may be configured as or otherwise support a means for receiving, from a first UE, a coordination message including a set of multiple availability statuses for each of a set of multiple sidelink resources, each availability status associated with a quantization level, where each quantization level is based on the one or more measurement statistics. The availability status manager 740 may be configured as or otherwise support a means for determining an availability status of the set of multiple sidelink resources based on the coordination message and the quantization levels. The sidelink manager 745 may be configured as or otherwise support a means for communicating on one or more of the set of multiple sidelink resources based on the determined availability statuses.

Figure 8:
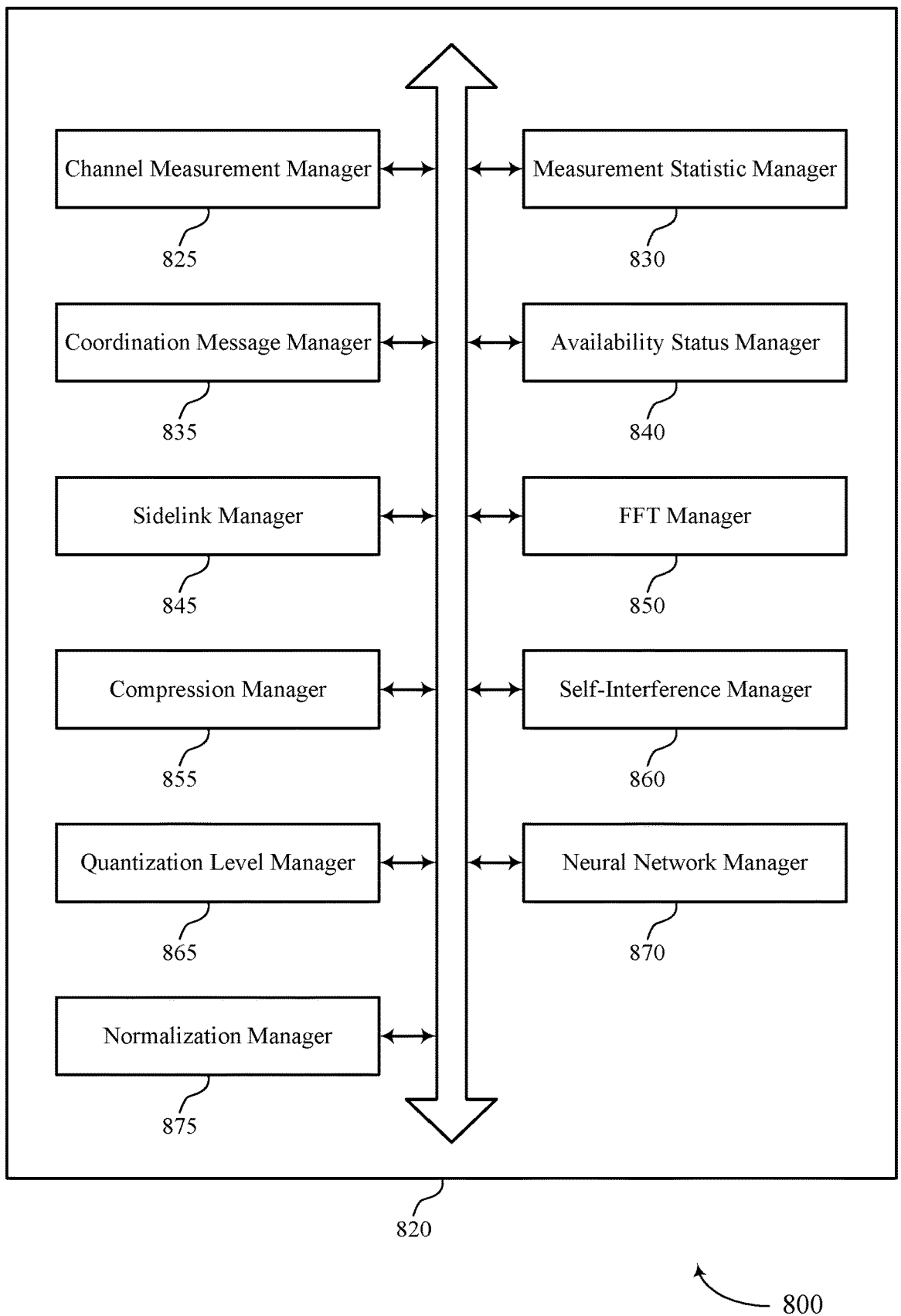
FIG. 8 shows a block diagram of a communications manager that supports sensing report quantization for inter-user equipment coordination in accordance with aspects of the present disclosure.

FIG. 8 shows a block diagram 800 of a communications manager 820 that supports sensing report quantization for inter-user equipment coordination in accordance with aspects of the present disclosure. The communications manager 820 may be an example of aspects of a communications manager 620, a communications manager 720, or both, as described herein. The communications manager 820, or various components thereof, may be an example of means for performing various aspects of sensing report quantization for inter-user equipment coordination as described herein. For example, the communications manager 820 may include a channel measurement manager 825, a measurement statistic manager 830, a coordination message manager 835, an availability status manager 840, a sidelink manager 845, an FFT manager 850, a compression manager 855, a self-interference manager 860, a quantization level manager 865, a neural network manager 870, a normalization manager 875, or any combination thereof. Each of these components may communicate, directly or indirectly, with one another (e.g., via one or more buses).

The communications manager 820 may support wireless communications at a first UE in accordance with examples as disclosed herein. The channel measurement manager 825 may be configured as or otherwise support a means for performing, during a selection window including a set of multiple sidelink resources, one or more channel quality measurements. The measurement statistic manager 830 may be configured as or otherwise support a means for generating, based on the one or more channel quality measurements, one or more measurement statistics for the set of multiple sidelink resources. The coordination message manager 835 may be configured as or otherwise support a means for transmitting, to a second UE, a coordination message including a set of multiple availability statuses for each of the set of multiple sidelink resources, each availability status associated with a quantization level, where the quantization level is based on the one or more measurement statistics.

In some examples, the coordination message manager 835 may be configured as or otherwise support a means for transmitting, in the coordination message, an indication of the one or more measurement statistics, where the one or more measurement statistics include a mean channel quality measurement for the set of multiple sidelink resources, and a variance of the one or more channel quality measurements for each of the set of multiple sidelink resources.

In some examples, the quantization level manager 865 may be configured as or otherwise support a means for determining a set of quantization levels, each quantization level based on the mean channel quality measurement and the variance of the one or more channel quality measurements, where a first subset of the set of quantization levels correspond to channel quality measurements that are less than the mean channel quality measurement, and a second subset of the set of quantization levels correspond to channel quality measurements that are greater than the mean channel quality measurement.

In some examples, a number of quantization levels in the first subset is equal to a number of quantization levels in the second subset.

In some examples, a number of quantization levels in the first subset is equal to a number of quantization levels in the second subset.

In some examples, the normalization manager 875 may be configured as or otherwise support a means for performing a normalization function on the one or more measurement statistics, where the quantization levels are based on the normalized one or more measurement statistics.

In some examples, the one or more measurement statistics includes one or more differential values for the one or more channel quality measurements.

In some examples, the coordination message manager 835 may be configured as or otherwise support a means for transmitting, in the coordination message, an indication of the one or more measurement statistics, where the one or more measurement statistics include a mean channel quality measurement for the set of multiple sidelink resources, and a cross-correlation value across a set of multiple time units of the selection window for each of the set of multiple sidelink resources.

In some examples, the neural network manager 870 may be configured as or otherwise support a means for inputting, into a neural network, the one or more measurement statistics. In some examples, the neural network manager 870 may be configured as or otherwise support a means for generating, as an output of the neural network, an initial set of values for the availability statuses of the set of multiple sidelink resources. In some examples, the neural network manager 870 may be configured as or otherwise support a means for applying a one-bit quantizer to the initial set of values to generate the set of multiple availability statuses for each of the set of multiple sidelink resources, where each of the set of multiple availability statuses is associated with a first quantization level or a second quantization level based on the one-bit quantizer.

In some examples, to support generating the one or more measurement statistics, the FFT manager 850 may be configured as or otherwise support a means for performing a Fourier transform on the one or more channel quality measurements. In some examples, to support generating the one or more measurement statistics, the FFT manager 850 may be configured as or otherwise support a means for determining a correlation level for a set of outputs of the Fourier transform. In some examples, to support generating the one or more measurement statistics, the FFT manager 850 may be configured as or otherwise support a means for generating the set of quantization levels based on the correlation level.

In some examples, the coordination message manager 835 may be configured as or otherwise support a means for transmitting, in the coordination message, an indication of a subset of the set of outputs that have non-zero values, the indication of the subset including a value of each of the subset of the set of outputs, a location in a discrete Fourier transform domain of each of the subset of the set of outputs, or any combination thereof.

In some examples, the compression manager 855 may be configured as or otherwise support a means for initiating a compression procedure, based on a bandwidth associated with the compression procedure. In some examples, the compression manager 855 may be configured as or otherwise support a means for determining that a likelihood of the compression procedure resulting in a successful compression of the one or more channel quality measurements satisfies a threshold. In some examples, the compression manager 855 may be configured as or otherwise support a means for compressing the one or more channel quality measurements, where generating the one or more measurement statistics is based on the compressing.

In some examples, the compression manager 855 may be configured as or otherwise support a means for initiating a compression procedure for the one or more measurement statistics, based on a bandwidth associated with the compression procedure. In some examples, the compression manager 855 may be configured as or otherwise support a means for determining that a likelihood of the compression procedure resulting in a successful compression of the one or more channel quality measurements does not satisfy a threshold. In some examples, the compression manager 855 may be configured as or otherwise support a means for transmitting, to the second UE on a sidelink control channel, an indication that the compression procedure was not successful. In some examples, the compression manager 855 may be configured as or otherwise support a means for transmitting, to the second UE on a sidelink shared channel in the coordination message, an indication of the one or more channel quality measurements.

In some examples, the self-interference manager 860 may be configured as or otherwise support a means for measuring self-interference generated by and received by the first UE. In some examples, the compression manager 855 may be configured as or otherwise support a means for determining the availability for each of the set of multiple sidelink resources based on the one or more measurement statistics and the self-interference.

Additionally, or alternatively, the communications manager 820 may support wireless communications at a second UE in accordance with examples as disclosed herein. In some examples, the coordination message manager 835 may be configured as or otherwise support a means for receiving, from a first UE, a coordination message including a set of multiple availability statuses for each of a set of multiple sidelink resources, each availability status associated with a quantization level, where each quantization level is based on the one or more measurement statistics. The availability status manager 840 may be configured as or otherwise support a means for determining an availability status of the set of multiple sidelink resources based on the coordination message and the quantization levels. The sidelink manager 845 may be configured as or otherwise support a means for communicating on one or more of the set of multiple sidelink resources based on the determined availability statuses.

In some examples, the coordination message manager 835 may be configured as or otherwise support a means for receiving, in the coordination message, an indication of the one or more measurement statistics, where the one or more measurement statistics include a mean channel quality measurement for the set of multiple sidelink resources, and a variance of the one or more channel quality measurements for each of the set of multiple sidelink resources.

In some examples, the one or more measurement statistics includes one or more differential values for the one or more channel quality measurements.

In some examples, the coordination message manager 835 may be configured as or otherwise support a means for receiving, in the coordination message, an indication of the one or more measurement statistics, where the one or more measurement statistics include a mean channel quality measurement for the set of multiple sidelink resources, and a cross-correlation value across a set of multiple time units of the selection window for each of the set of multiple sidelink resources.

In some examples, the coordination message manager 835 may be configured as or otherwise support a means for receiving, in the coordination message, an indication of a subset of a set of outputs of a Fourier transform performed on the one or more channel quality measurements that have non-zero values, the indication of the subset including a value of each of the subset of the set of outputs, a location in a discrete Fourier transform domain of each of the subset of the set of outputs, or any combination thereof.

In some examples, the coordination message manager 835 may be configured as or otherwise support a means for receiving, from the first UE on a sidelink shared channel in the coordination message, an indication of one or more channel quality measurements.

Figure 9:
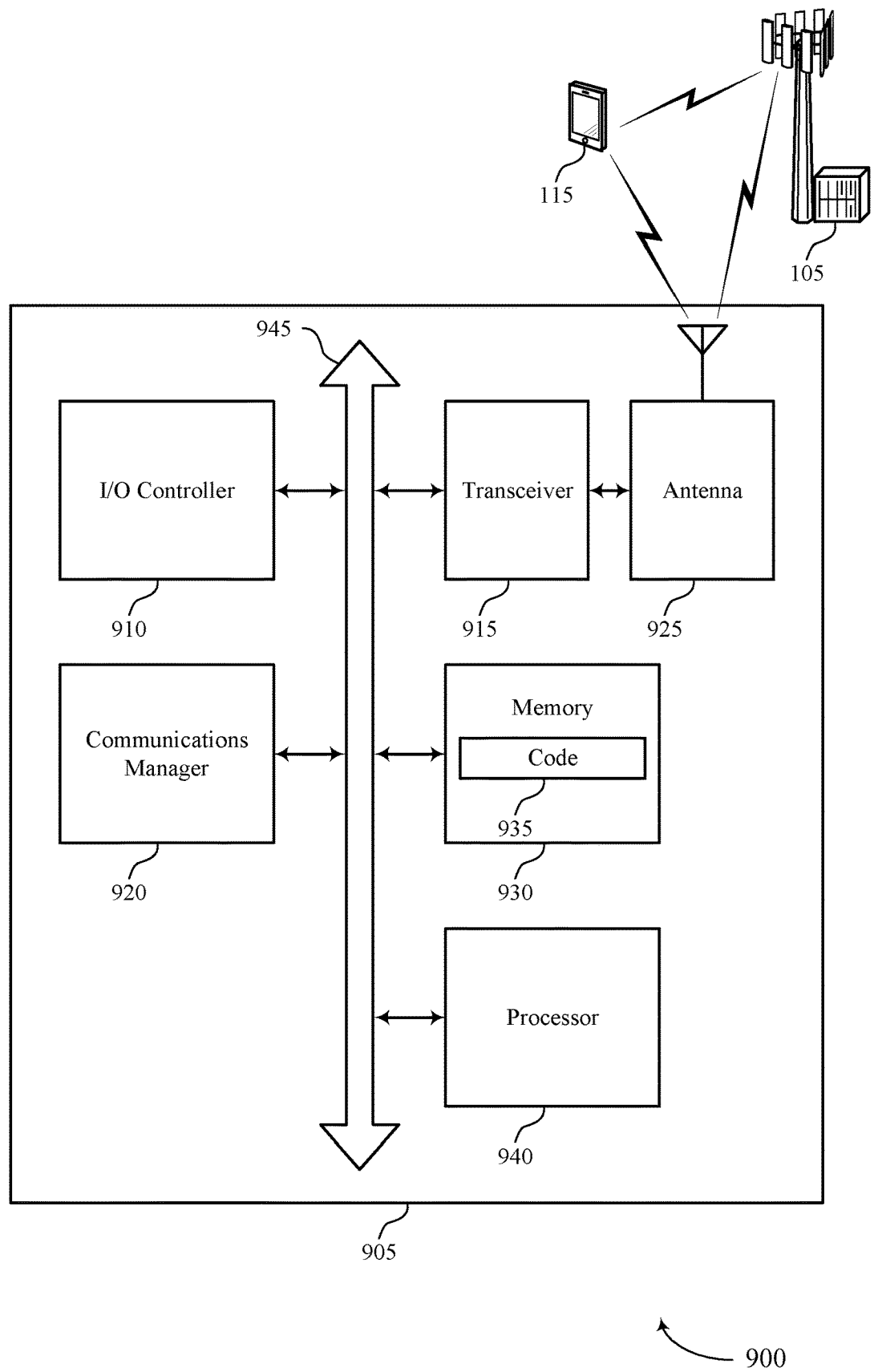
FIG. 9 shows a diagram of a system including a device that supports sensing report quantization for inter-user equipment coordination in accordance with aspects of the present disclosure.

FIG. 9 shows a diagram of a system 900 including a device 905 that supports sensing report quantization for inter-user equipment coordination in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sensing report quantization for inter-user equipment coordination). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for performing, during a selection window including a set of multiple sidelink resources, one or more channel quality measurements. The communications manager 920 may be configured as or otherwise support a means for generating, basing at least in part on the one or more channel quality measurements, one or more measurement statistics for the set of multiple sidelink resources. The communications manager 920 may be configured as or otherwise support a means for transmitting, to a second UE, a coordination message including a set of multiple availability statuses for each of the set of multiple sidelink resources, each availability status associated with a quantization level, where the quantization level is based on the one or more measurement statistics.

Additionally, or alternatively, the communications manager 920 may support wireless communications at a second UE in accordance with examples as disclosed herein. For example, the communications manager 920 may be configured as or otherwise support a means for receiving, from a first UE, a coordination message including a set of multiple availability statuses for each of a set of multiple sidelink resources, each availability status associated with a quantization level, where each quantization level is based on the one or more measurement statistics. The communications manager 920 may be configured as or otherwise support a means for determining an availability status of the set of multiple sidelink resources based on the coordination message and the quantization levels. The communications manager 920 may be configured as or otherwise support a means for communicating on one or more of the set of multiple sidelink resources based on the determined availability statuses.

By including or configuring the communications manager 920 in accordance with examples as described herein, the device 905 may support techniques for inter-UE coordination resulting in more efficient use of available resources, decreased latency, decreased interference, improved reliability of communications, and improved user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sensing report quantization for inter-user equipment coordination as described herein, or the processor 940 and the memory 930 may be otherwise configured to perform or support such operations.

Figure 10:
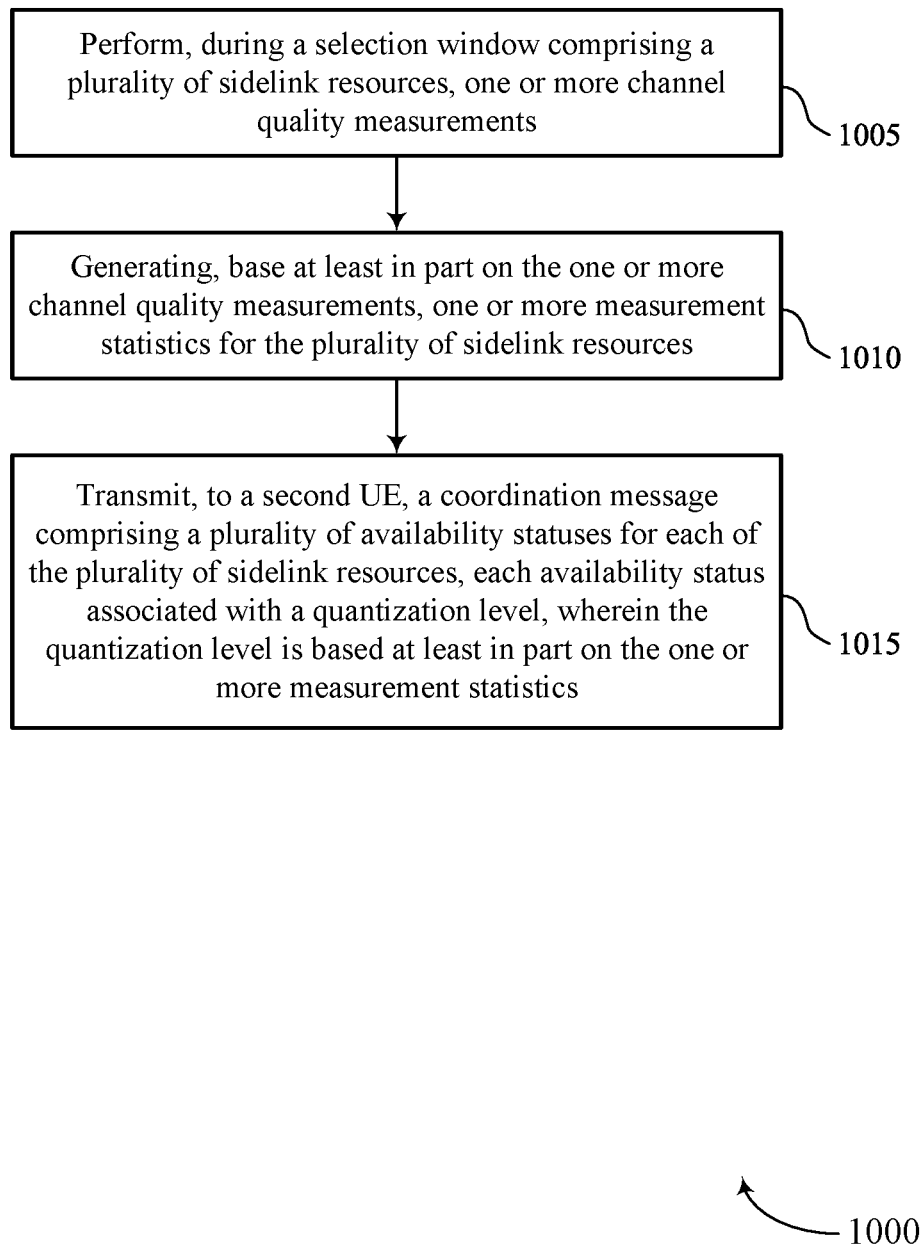
FIGS. 10 through 12 show flowcharts illustrating methods that support sensing report quantization for inter-user equipment coordination in accordance with aspects of the present disclosure.

FIG. 10 shows a flowchart illustrating a method 1000 that supports sensing report quantization for inter-user equipment coordination in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include performing, during a selection window including a set of multiple sidelink resources, one or more channel quality measurements. The operations of 1005 may be performed in accordance with examples as disclosed herein. In some examples, aspects of the operations of 1005 may be performed by a channel measurement manager 825 as described with reference to FIG. 8.

At 1010, the method may include generating, based on the one or more channel quality measurements, one or more measurement statistics for the set of multiple sidelink resources. The operations of 1010 may be performed in accordance with examples as disclosed herein. In some examples, aspects of the operations of 1010 may be performed by a measurement statistic manager 830 as described with reference to FIG. 8.

At 1015, the method may include transmitting, to a second UE, a coordination message including a set of multiple availability statuses for each of the set of multiple sidelink resources, each availability status associated with a quantization level, where the quantization level is based on the one or more measurement statistics. The operations of 1015 may be performed in accordance with examples as disclosed herein. In some examples, aspects of the operations of 1015 may be performed by a coordination message manager 835 as described with reference to FIG. 8.

Figure 11:
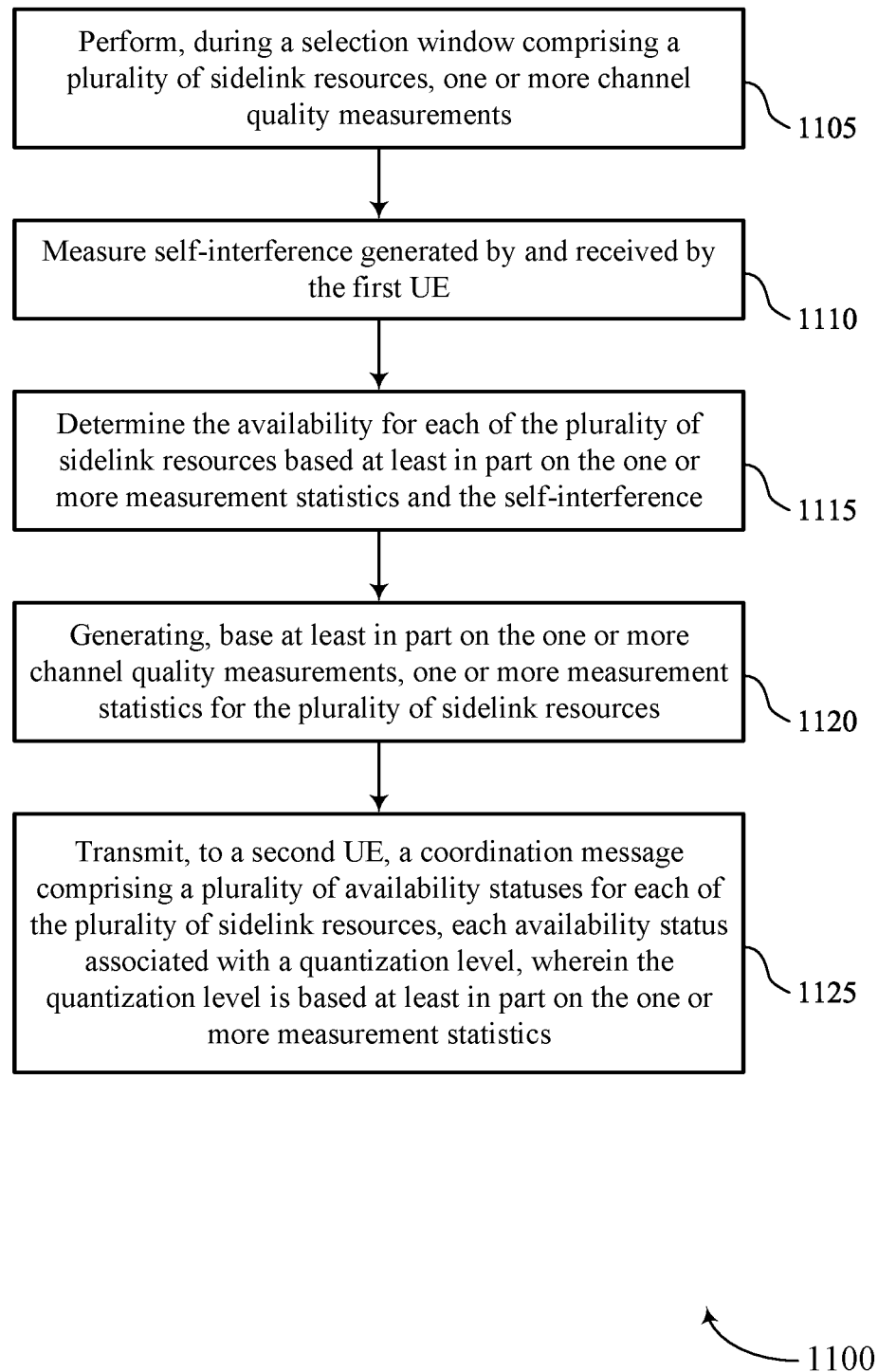

FIG. 11 shows a flowchart illustrating a method 1100 that supports sensing report quantization for inter-user equipment coordination in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include performing, during a selection window including a set of multiple sidelink resources, one or more channel quality measurements. The operations of 1105 may be performed in accordance with examples as disclosed herein. In some examples, aspects of the operations of 1105 may be performed by a channel measurement manager 825 as described with reference to FIG. 8.

At 1110, the method may include measuring self-interference generated by and received by the first UE. The operations of 1110 may be performed in accordance with examples as disclosed herein. In some examples, aspects of the operations of 1110 may be performed by a self-interference manager 860 as described with reference to FIG. 8.

At 1115, the method may include determining the availability for each of the set of multiple sidelink resources based on the one or more measurement statistics and the self-interference. The operations of 1115 may be performed in accordance with examples as disclosed herein. In some examples, aspects of the operations of 1115 may be performed by a compression manager 855 as described with reference to FIG. 8.

At 1120, the method may include generating, based on the one or more channel quality measurements, one or more measurement statistics for the set of multiple sidelink resources. The operations of 1120 may be performed in accordance with examples as disclosed herein. In some examples, aspects of the operations of 1120 may be performed by a measurement statistic manager 830 as described with reference to FIG. 8.

At 1125, the method may include transmitting, to a second UE, a coordination message including a set of multiple availability statuses for each of the set of multiple sidelink resources, each availability status associated with a quantization level, where the quantization level is based on the one or more measurement statistics. The operations of 1125 may be performed in accordance with examples as disclosed herein. In some examples, aspects of the operations of 1125 may be performed by a coordination message manager 835 as described with reference to FIG. 8.

Figure 12:
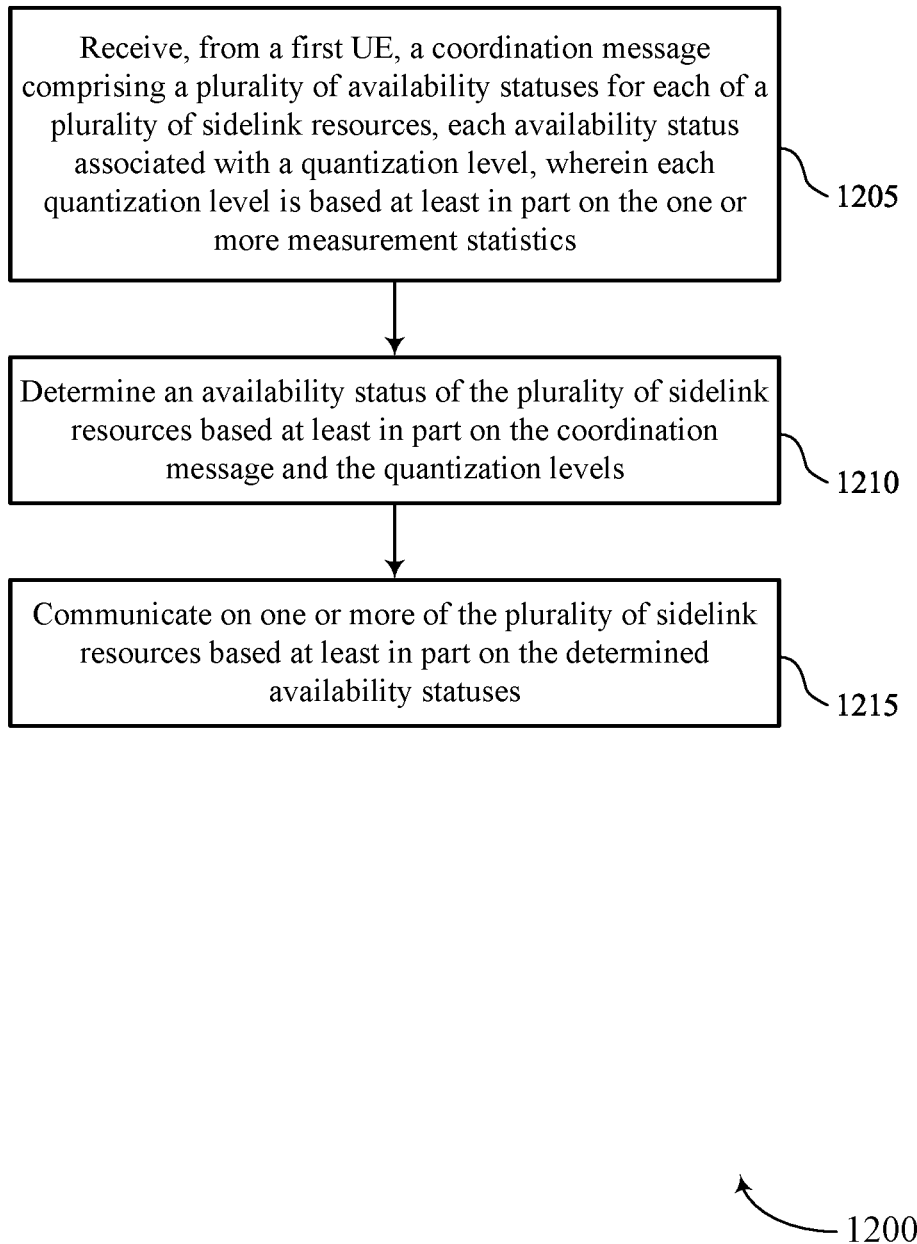

FIG. 12 shows a flowchart illustrating a method 1200 that supports sensing report quantization for inter-user equipment coordination in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving, from a first UE, a coordination message including a set of multiple availability statuses for each of a set of multiple sidelink resources, each availability status associated with a quantization level, where each quantization level is based on the one or more measurement statistics. The operations of 1205 may be performed in accordance with examples as disclosed herein. In some examples, aspects of the operations of 1205 may be performed by a coordination message manager 835 as described with reference to FIG. 8.

At 1210, the method may include determining an availability status of the set of multiple sidelink resources based on the coordination message and the quantization levels. The operations of 1210 may be performed in accordance with examples as disclosed herein. In some examples, aspects of the operations of 1210 may be performed by an availability status manager 840 as described with reference to FIG. 8.

At 1215, the method may include communicating on one or more of the set of multiple sidelink resources based on the determined availability statuses. The operations of 1215 may be performed in accordance with examples as disclosed herein. In some examples, aspects of the operations of 1215 may be performed by a sidelink manager 845 as described with reference to FIG. 8.

Aspect 1: A method for wireless communications at a first UE, comprising: performing, during a selection window comprising a plurality of sidelink resources, one or more channel quality measurements; generating, based at least in part on the one or more channel quality measurements, one or more measurement statistics for the plurality of sidelink resources; and transmitting, to a second UE, a coordination message comprising a plurality of availability statuses for each of the plurality of sidelink resources, each availability status associated with a quantization level, wherein the quantization level is based at least in part on the one or more measurement statistics.

Aspect 2: The method of aspect 1, further comprising: transmitting, in the coordination message, an indication of the one or more measurement statistics, wherein the one or more measurement statistics comprise a mean channel quality measurement for the plurality of sidelink resources, and a variance of the one or more channel quality measurements for each of the plurality of sidelink resources.

Aspect 3: The method of aspect 2, further comprising: determining a set of quantization levels, each quantization level based at least in part on the mean channel quality measurement and the variance of the one or more channel quality measurements, wherein a first subset of the set of quantization levels correspond to channel quality measurements that are less than the mean channel quality measurement, and a second subset of the set of quantization levels correspond to channel quality measurements that are greater than the mean channel quality measurement.

Aspect 4: The method of aspect 3, wherein a number of quantization levels in the first subset is equal to a number of quantization levels in the second subset.

Aspect 5: The method of any of aspects 3 through 4, wherein a number of quantization levels in the first subset is equal to a number of quantization levels in the second sub set.

Aspect 6: The method of any of aspects 3 through 5, further comprising: performing a normalization function on the one or more measurement statistics, wherein the quantization levels are based at least in part on the normalized one or more measurement statistics.

Aspect 7: The method of any of aspects 2 through 6, wherein the one or more measurement statistics comprises one or more differential values for the one or more channel quality measurements.

Aspect 8: The method of any of aspects 1 through 7, further comprising: transmitting, in the coordination message, an indication of the one or more measurement statistics, wherein the one or more measurement statistics comprise a mean channel quality measurement for the plurality of sidelink resources, and a cross-correlation value across a plurality of time units of the selection window for each of the plurality of sidelink resources.

Aspect 9: The method of aspect 8, further comprising: inputting, into a neural network, the one or more measurement statistics; generating, as an output of the neural network, an initial set of values for the availability statuses of the plurality of sidelink resources; and applying a one-bit quantizer to the initial set of values to generate the plurality of availability statuses for each of the plurality of sidelink resources, wherein each of the plurality of availability statuses is associated with a first quantization level or a second quantization level based at least in part on the one-bit quantizer.

Aspect 10: The method of any of aspects 1 through 9, wherein generating the one or more measurement statistics comprises: performing a Fourier transform on the one or more channel quality measurements; determining a correlation level for a set of outputs of the Fourier transform; and generating the set of quantization levels based at least in part on the correlation level.

Aspect 11: The method of aspect 10, further comprising: transmitting, in the coordination message, an indication of a subset of the set of outputs that have non-zero values, the indication of the subset comprising a value of each of the subset of the set of outputs, a location in a discrete Fourier transform domain of each of the subset of the set of outputs, or any combination thereof.

Aspect 12: The method of any of aspects 1 through 11, further comprising: initiating a compression procedure, based at least in part on a bandwidth associated with the compression procedure; determining that a likelihood of the compression procedure resulting in a successful compression of the one or more channel quality measurements satisfies a threshold; and compressing the one or more channel quality measurements, wherein generating the one or more measurement statistics is based at least in part on the compressing.

Aspect 13: The method of any of aspects 1 through 12, further comprising: initiating a compression procedure for the one or more measurement statistics, based at least in part on a bandwidth associated with the compression procedure; determining that a likelihood of the compression procedure resulting in a successful compression of the one or more channel quality measurements does not satisfy a threshold; and transmitting, to the second UE on a sidelink control channel, an indication that the compression procedure was not successful; and transmitting, to the second UE on a sidelink shared channel in the coordination message, an indication of the one or more channel quality measurements.

Aspect 14: The method of any of aspects 1 through 13, further comprising: measuring self-interference generated by and received by the first UE; determining the availability for each of the plurality of sidelink resources based at least in part on the one or more measurement statistics and the self-interference.

Aspect 15: A method for wireless communications at a second UE, comprising: receiving, from a first UE, a coordination message comprising a plurality of availability statuses for each of a plurality of sidelink resources, each availability status associated with a quantization level, wherein each quantization level is based at least in part on the one or more measurement statistics; determining an availability status of the plurality of sidelink resources based at least in part on the coordination message and the quantization levels; and communicating on one or more of the plurality of sidelink resources based at least in part on the determined availability statuses.

Aspect 16: The method of aspect 15, further comprising: receiving, in the coordination message, an indication of the one or more measurement statistics, wherein the one or more measurement statistics comprise a mean channel quality measurement for the plurality of sidelink resources, and a variance of the one or more channel quality measurements for each of the plurality of sidelink resources.

Aspect 17: The method of any of aspects 15 through 16, wherein the one or more measurement statistics comprises one or more differential values for the one or more channel quality measurements.

Aspect 18: The method of any of aspects 15 through 17, further comprising: receiving, in the coordination message, an indication of the one or more measurement statistics, wherein the one or more measurement statistics comprise a mean channel quality measurement for the plurality of sidelink resources, and a cross-correlation value across a plurality of time units of the selection window for each of the plurality of sidelink resources.

Aspect 19: The method of any of aspects 15 through 18, further comprising: receiving, in the coordination message, an indication of a subset of a set of outputs of a Fourier transform performed on the one or more channel quality measurements that have non-zero values, the indication of the subset comprising a value of each of the subset of the set of outputs, a location in a discrete Fourier transform domain of each of the subset of the set of outputs, or any combination thereof.

Aspect 20: The method of any of aspects 15 through 19, further comprising: receiving, from the first UE on a sidelink shared channel in the coordination message, an indication of one or more channel quality measurements.

Aspect 21: An apparatus for wireless communications at a first UE, comprising a processor; memory coupled with the processor; and instructions stored in the memory and executable by the processor to cause the apparatus to perform a method of any of aspects 1 through 14.

Aspect 22: An apparatus for wireless communications at a first UE, comprising at least one means for performing a method of any of aspects 1 through 14.

Aspect 23: A non-transitory computer-readable medium storing code for wireless communications at a first UE, the code comprising instructions executable by a processor to perform a method of any of aspects 1 through 14.

Aspect 24: An apparatus for wireless communications at a second UE, comprising a processor; memory coupled with the processor; and instructions stored in the memory and executable by the processor to cause the apparatus to perform a method of any of aspects 15 through 20.

Aspect 25: An apparatus for wireless communications at a second UE, comprising at least one means for performing a method of any of aspects 15 through 20.

Aspect 26: A non-transitory computer-readable medium storing code for wireless communications at a second UE, the code comprising instructions executable by a processor to perform a method of any of aspects 15 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   performing, during a selection window comprising a plurality of sidelink resources, one or more channel quality measurements;
   generating, based at least in part on the one or more channel quality measurements, one or more measurement statistics for the plurality of sidelink resources; and
   transmitting, to a second UE, a coordination message comprising a plurality of availability statuses for each of the plurality of sidelink resources, each availability status associated with a quantization level, wherein the quantization level is based at least in part on the one or more measurement statistics.

2. The method of claim 1, further comprising:
   transmitting, in the coordination message, an indication of the one or more measurement statistics, wherein the one or more measurement statistics comprise a mean channel quality measurement for the plurality of sidelink resources, and a variance of the one or more channel quality measurements for each of the plurality of sidelink resources.

3. The method of claim 2, further comprising:
determining a set of quantization levels, each quantization level based at least in part on the mean channel quality measurement and the variance of the one or more channel quality measurements, wherein a first subset of the set of quantization levels correspond to channel quality measurements that are less than the mean channel quality measurement, and a second subset of the set of quantization levels correspond to channel quality measurements that are greater than the mean channel quality measurement.

4. The method of claim 3, wherein a number of quantization levels in the first subset is equal to a number of quantization levels in the second subset.

5. The method of claim 3, wherein a number of quantization levels in the first subset is equal to a number of quantization levels in the second subset.

6. The method of claim 3, further comprising:
performing a normalization function on the one or more measurement statistics, wherein the quantization levels are based at least in part on the normalized one or more measurement statistics.

7. The method of claim 2, wherein the one or more measurement statistics comprises one or more differential values for the one or more channel quality measurements.

8. The method of claim 1, further comprising:
transmitting, in the coordination message, an indication of the one or more measurement statistics, wherein the one or more measurement statistics comprise a mean channel quality measurement for the plurality of sidelink resources, and a cross-correlation value across a plurality of time units of the selection window for each of the plurality of sidelink resources.

9. The method of claim 8, further comprising:
inputting, into a neural network, the one or more measurement statistics;
generating, as an output of the neural network, an initial set of values for the availability statuses of the plurality of sidelink resources; and
applying a one-bit quantizer to the initial set of values to generate the plurality of availability statuses for each of the plurality of sidelink resources, wherein each of the plurality of availability statuses is associated with a first quantization level or a second quantization level based at least in part on the one-bit quantizer.

10. The method of claim 1, wherein generating the one or more measurement statistics comprises:
performing a Fourier transform on the one or more channel quality measurements;
determining a correlation level for a set of outputs of the Fourier transform; and
generating the set of quantization levels based at least in part on the correlation level.

11. The method of claim 10, further comprising:
transmitting, in the coordination message, an indication of a subset of the set of outputs that have non-zero values, the indication of the subset comprising a value of each of the subset of the set of outputs, a location in a discrete Fourier transform domain of each of the subset of the set of outputs, or any combination thereof.

12. The method of claim 1, further comprising:
initiating a compression procedure, based at least in part on a bandwidth associated with the compression procedure;
determining that a likelihood of the compression procedure resulting in a successful compression of the one or more channel quality measurements satisfies a threshold; and
compressing the one or more channel quality measurements, wherein generating the one or more measurement statistics is based at least in part on the compressing.

13. The method of claim 1, further comprising:
initiating a compression procedure for the one or more measurement statistics, based at least in part on a bandwidth associated with the compression procedure;
determining that a likelihood of the compression procedure resulting in a successful compression of the one or more channel quality measurements does not satisfy a threshold; and
transmitting, to the second UE on a sidelink control channel, an indication that the compression procedure was not successful; and
transmitting, to the second UE on a sidelink shared channel in the coordination message, an indication of the one or more channel quality measurements.

14. The method of claim 1, further comprising:
measuring self-interference generated by and received by the first UE;
determining the availability for each of the plurality of sidelink resources based at least in part on the one or more measurement statistics and the self-interference.

15. A method for wireless communications at a second user equipment (UE), comprising:
receiving, from a first UE, a coordination message comprising a plurality of availability statuses for each of a plurality of sidelink resources, each availability status associated with a quantization level, wherein each quantization level is based at least in part on one or more measurement statistics;
determining a combined availability status of the plurality of sidelink resources based at least in part on the coordination message and the quantization levels; and
communicating on one or more of the plurality of sidelink resources based at least in part on the determined combined availability statuses.

16. The method of claim 15, further comprising:
receiving, in the coordination message, an indication of the one or more measurement statistics, wherein the one or more measurement statistics comprise a mean channel quality measurement for the plurality of sidelink resources, and a variance of the one or more channel quality measurements for each of the plurality of sidelink resources.

17. The method of claim 15, wherein the one or more measurement statistics comprises one or more differential values for the one or more channel quality measurements.

18. The method of claim 15, further comprising:
receiving, in the coordination message, an indication of the one or more measurement statistics, wherein the one or more measurement statistics comprise a mean channel quality measurement for the plurality of sidelink resources, and a cross-correlation value across a plurality of time units of the selection window for each of the plurality of sidelink resources.

19. The method of claim 15, further comprising:
receiving, in the coordination message, an indication of a subset of a set of outputs of a Fourier transform performed on the one or more channel quality measurements that have non-zero values, the indication of the subset comprising a value of each of the subset of the set of outputs, a location in a discrete Fourier transform domain of each of the subset of the set of outputs, or any combination thereof.

20. The method of claim 15, further comprising:
receiving, from the first UE on a sidelink shared channel in the coordination message, an indication of one or more channel quality measurements.

21. A first user equipment (UE), comprising:
a processor;
memory coupled with the processor; and
instructions stored in the memory and executable by the processor to cause the apparatus to:
perform, during a selection window comprising a plurality of sidelink resources, one or more channel quality measurements;
generate, based at least in part on the one or more channel quality measurements, one or more measurement statistics for the plurality of sidelink resources; and
transmit, to a second UE, a coordination message comprising a plurality of availability statuses for each of the plurality of sidelink resources, each availability status associated with a quantization level, wherein the quantization level is based at least in part on the one or more measurement statistics.

22. The apparatus of claim 21, wherein the instructions are further executable by the processor to cause the apparatus to:
transmit, in the coordination message, an indication of the one or more measurement statistics, wherein the one or more measurement statistics comprise a mean channel quality measurement for the plurality of sidelink resources, and a variance of the one or more channel quality measurements for each of the plurality of sidelink resources.

23. The apparatus of claim 22, wherein the instructions are further executable by the processor to cause the apparatus to:
determine a set of quantization levels, each quantization level based at least in part on the mean channel quality measurement and the variance of the one or more channel quality measurements, wherein a first subset of the set of quantization levels correspond to channel quality measurements that are less than the mean channel quality measurement, and a second subset of the set of quantization levels correspond to channel quality measurements that are greater than the mean channel quality measurement.

24. The apparatus of claim 21, wherein the instructions are further executable by the processor to cause the apparatus to:
transmit, in the coordination message, an indication of the one or more measurement statistics, wherein the one or more measurement statistics comprise a mean channel quality measurement for the plurality of sidelink resources, and a cross-correlation value across a plurality of time units of the selection window for each of the plurality of sidelink resources.

25. The apparatus of claim 24, wherein the instructions are further executable by the processor to cause the apparatus to:
input, into a neural network, the one or more measurement statistics;
generate, as an output of the neural network, an initial set of values for the availability statuses of the plurality of sidelink resources; and apply a one-bit quantizer to the initial set of values to generate the plurality of availability statuses for each of the plurality of sidelink resources, wherein each of the plurality of availability statuses is associated with a first quantization level or a second quantization level based at least in part on the one-bit quantizer.

26. The apparatus of claim 21, wherein the instructions to generate the one or more measurement statistics are executable by the processor to cause the apparatus to:
perform a Fourier transform on the one or more channel quality measurements;
determine a correlation level for a set of outputs of the Fourier transform; and
generate the set of quantization levels based at least in part on the correlation level.

27. The apparatus of claim 26, wherein the instructions are further executable by the processor to cause the apparatus to:
transmit, in the coordination message, an indication of a subset of the set of outputs that have non-zero values, the indication of the subset comprising a value of each of the subset of the set of outputs, a location in a discrete Fourier transform domain of each of the subset of the set of outputs, or any combination thereof.

28. The apparatus of claim 21, wherein the instructions are further executable by the processor to cause the apparatus to:
initiate a compression procedure, based at least in part on a bandwidth associated with the compression procedure;
determine that a likelihood of the compression procedure resulting in a successful compression of the one or more channel quality measurements satisfies a threshold; and
compress the one or more channel quality measurements, wherein generating the one or more measurement statistics is based at least in part on the compressing.

29. The apparatus of claim 21, wherein the instructions are further executable by the processor to cause the apparatus to:
initiate a compression procedure for the one or more measurement statistics, based at least in part on a bandwidth associated with the compression procedure;
determine that a likelihood of the compression procedure resulting in a successful compression of the one or more channel quality measurements does not satisfy a threshold; and
transmit, to the second UE on a sidelink control channel, an indication that the compression procedure was not successful; and
transmit, to the second UE on a sidelink shared channel in the coordination message, an indication of the one or more channel quality measurements.

30. A second user equipment (UE), comprising:
a processor;
memory coupled with the processor; and
instructions stored in the memory and executable by the processor to cause the apparatus to:
receive, from a first UE, a coordination message comprising a plurality of availability statuses for each of a plurality of sidelink resources, each availability status associated with a quantization level, wherein each quantization level is based at least in part on one or more measurement statistics;

determine a combined availability status of the plurality of sidelink resources based at least in part on the coordination message and the quantization levels; and communicate on one or more of the plurality of sidelink resources based at least in part on the determined combined availability statuses.

* * * * *